United States Patent
Harmon

(10) Patent No.: US 7,710,822 B2
(45) Date of Patent: *May 4, 2010

(54) VERTICAL SEISMIC PROFILING METHOD UTILIZING SEISMIC COMMUNICATION AND SYNCHRONIZATION

(75) Inventor: Jerald L. Harmon, 1315 Meadowlark La., Sugar Land, TX (US) 77478

(73) Assignee: Jerald L. Harmon, Sugar Land, TX (US)

( * ) Notice: Subject to any disclaimer, the term of this patent is extended or adjusted under 35 U.S.C. 154(b) by 2 days.

This patent is subject to a terminal disclaimer.

(21) Appl. No.: 12/231,031

(22) Filed: Aug. 28, 2008

(65) Prior Publication Data

US 2009/0012711 A1 Jan. 8, 2009

Related U.S. Application Data

(62) Division of application No. 11/370,620, filed on Mar. 8, 2006, now Pat. No. 7,551,516.

(51) Int. Cl.
*G01V 1/00* (2006.01)

(52) U.S. Cl. .................. 367/25; 367/57; 702/6

(58) Field of Classification Search ............. 367/25, 367/57, 88; 702/6
See application file for complete search history.

(56) References Cited

U.S. PATENT DOCUMENTS

| | | | |
|---|---|---|---|
| 4,563,757 A | 1/1986 | Decorps et al. | |
| 5,941,307 A | 8/1999 | Tubel | |
| 6,192,988 B1 | 2/2001 | Tibel | |
| 6,257,332 B1 | 7/2001 | Vidrine et al. | |
| 6,308,137 B1 | 10/2001 | Underhill et al. | |
| 6,384,738 B1 | 5/2002 | Carstensen et al. | |
| 6,388,577 B1 | 5/2002 | Carstensen | |
| 6,400,646 B1 | 6/2002 | Shah et al. | |
| 6,464,011 B2 | 10/2002 | Tubel | |
| 6,710,720 B2 | 3/2004 | Carstensen et al. | |
| 6,760,275 B2 | 7/2004 | Carstensen | |
| 6,766,854 B2 | 7/2004 | Ciglenec et al. | |
| 6,990,045 B2 | 1/2006 | Jackson | |
| 7,116,182 B2 | 10/2006 | Varsamis et al. | |
| 7,551,516 B2 * | 6/2009 | Harmon .................. 367/25 |
| 2003/0001753 A1 | 1/2003 | Cernocky et al. | |
| 2005/0012561 A1 | 1/2005 | Young et al. | |
| 2006/0203614 A1 | 9/2006 | Harmon | |
| 2008/0086270 A1 | 4/2008 | Mathiszik | |

FOREIGN PATENT DOCUMENTS

| | | |
|---|---|---|
| EP | 00939195 B | 2/1998 |
| WO | WO 00/13043 | 9/1998 |
| WO | WO 2004/109926 | 6/2003 |

* cited by examiner

*Primary Examiner*—Mark Hellner
(74) *Attorney, Agent, or Firm*—W. Allen Marcontell

(57) ABSTRACT

A while-drilling Vertical Seismic Profiling (VSP) data acquisition system utilizing the same seismic shots for three purposes is disclosed. First, the seismic shots provide a means for synchronizing a downhole clock in the VSP receiver to a master clock at the surface, thereby enabling correct determination of seismic travel times. Second, the same seismic shots are also used to communicate commands and other information to the downhole VSP receiver, such commands controlling the actions of the VSP receiver or associated devices. Third, the same seismic shots are utilized for purposes of the VSP survey itself, i.e. determination of seismic travel times, forming of seismic images, and determination of geologic and formation fluid properties using the VSP methods.

5 Claims, 27 Drawing Sheets

ENHANCED SEISMIC SHOT/SIGNAL ESTIMATE

CROSS-CORRELATIONS

TABLE 1

PROJECT MENU EXAMPLE DEMONSTRATING COMMUNICATION WITH A VSP TOOL, LINKED TO OTHER CONTROLLABLE TOOLS AND UTILIZING BINARY SEISMIC SIGNALS ONLY

Project Fixed Parameters

| Parameter Name | Symbol | Source | General Default | Allowed Values | Units |
|---|---|---|---|---|---|
| Project Name | PN | Project File | VSP BINARY ONLY | up to 64 characters | alphanumeric |
| SISS Unit Time Step | UTS | Project File | 0.200 | 0.005 to 0.500 in steps of 0.005 | seconds |
| Listen Time | LT | Project File | 6.000 | 0.500 to 25.000 in steps of 0.500 | seconds |
| Buffer Time | BT | Project File | 4.000 | 0.500 to 25.000 in steps of 0.500 | seconds |
| PTW Interval | ZPTW | Project File | CONTINUOUS | at integer multiples of 10.0000 sec | |
| Start Time of First PTW | SPTW | Project File | NOISE CONTROLLED | WHEN NOISE < 25 Mbar for 10 sec | minutes |
| Sweep Length | RL | Project File | NA | impulsive source | seconds |
| Sample Period | SP | Project File | 1 millisecond | .50, 1, 2, 3, 4, 6 | milliseconds |
| VSPDAU Model Number | | General Menu | 1.2 HX Model 2 | 16 characters | alphanumeric |
| VSP Software Version | | Software | Version 2.0 | 16 characters | alphanumeric |
| Client Identification | | Project File | Argus WW | 64 characters | alphanumeric |
| Contractor Identification | | Project File | Contractor ID | 64 characters | alphanumeric |
| Receiver Types | RT | Project File | Hydrophone + 3C Geop. | 64 characters | alphanumeric |
| Source Types | | Project File | Airgun Array 1210 | 64 characters | alphanumeric |
| Number of Primary Shots | AEF | Project File | 10 | 32 characters | alphanumeric |
| Number of Secondary Shots | | Project File | 9 | 32 characters | alphanumeric |
| Minimum Correlation Coeff. | MINCC | Project File | 0.7 | 0 to 1 | none |
| Gain Mode for SISS DP | GM | Project File | Constant Gain | 16 characters | alphanumeric |
| Back Up Mode | BUM | Project File | Use parameters from GD | 32 characters | alphanumeric |
| Other General Parameters | | Project File | As defined | | |

FIG. 14a

TABLE 1 (cont'd)

PROJECT MENU EXAMPLE DEMONSTRATING COMMUNICATION WITH A VSP TOOL, LINKED TO OTHER CONTROLLABLE TOOLS AND UTILIZING BINARY SEISMIC SIGNALS ONLY

| Parameter Name | Symbol | Shot ID | Variable Communicated Parameters | | | Maximum Ordinal Count | Cum. Max. Ordinal Count | Earliest Shot Time | Latest Shot Time |
|---|---|---|---|---|---|---|---|---|---|
| | | | General Default | Allowed Values | Units | | | | |
| Initial N Shot | N1 | 1 | No Default Allowed | 1 | integer | 1 | 1 | 0.000 | 0.000 |
| | N2 | 2 | No Default Allowed | 1 | integer | 1 | 2 | 10.000 | 10.000 |
| | N3 | 3 | No Default Allowed | 1 | integer | 1 | 3 | 20.000 | 20.000 |
| | N4 | 4 | No Default Allowed | 1 | integer | 1 | 4 | 30.000 | 30.000 |
| | N5 | 5 | No Default Allowed | 1 | integer | 1 | 5 | 40.000 | 40.000 |
| | N6 | 6 | No Default Allowed | 1 | integer | 1 | 6 | 50.000 | 50.000 |
| | N7 | 7 | No Default Allowed | 1 | integer | 1 | 7 | 60.000 | 60.000 |
| | N8 | 8 | No Default Allowed | 1 | integer | 1 | 8 | 70.000 | 70.000 |
| | N9 | 9 | No Default Allowed | 1 | integer | 1 | 9 | 80.000 | 80.000 |
| Final N Shot | N10 | 10 | No Default Allowed | 1 | integer | 1 | 10 | 90.000 | 90.000 |
| Send Travel Time Uphole | M1 | 11 | 0 | 1 or 0 | integer | 1 | 11 | 100.000 | 100.000 |
| Send Quality Index Uphole | M2 | 12 | 0 | 1 or 0 | integer | 1 | 12 | 110.000 | 110.000 |
| Send Probable Clock Drift Uphole | M3 | 13 | 0 | 1 or 0 | integer | 1 | 13 | 120.000 | 120.000 |
| Send Probable Velocity Model Error Uphole | M4 | 14 | 0 | 1 or 0 | integer | 1 | 14 | 130.000 | 130.000 |
| Send Battery Status Uphole | M5 | 15 | 0 | 1 or 0 | integer | 1 | 15 | 140.000 | 140.000 |
| Activate/Deactivate Sonic WD Tool | M6 | 16 | 0 | 1 or 0 | integer | 1 | 16 | 150.000 | 150.000 |
| Send Sonic Data Uphole | M7 | 17 | 0 | 1 or 0 | integer | 1 | 17 | 160.000 | 160.000 |
| Activate/Deactivate WD Tool 3 | M8 | 18 | 0 | 1 or 0 | integer | 1 | 18 | 170.000 | 170.000 |
| Send WD Tool 3 Data Uphole | M9 | 19 | 0 | 1 or 0 | integer | 1 | 19 | 180.000 | 180.000 |

FIG. 14b

TABLE 2
FIRST EXAMPLE OF APPLICATION OF PROJECT MENU FROM TABLE 1

| Settings | Selected data to be sent uphole<br>Sonic WD tool to be activated<br>Other WD tool not to be activated | | |
|---|---|---|---|
| Example Project 1 | These parameters | | |
| UTS=0.200 | are not transmitted | | |
| LT=6 | but are preloaded at surface. | | |
| BT=4 | | | |
| CONTINUOUS | | | |
| Noise<25 Mbars for 10 sec | | | |
| impulsive | | | |
| SP=1 msec | | | |
| 12 HX Model 2 | | | |
| Version 2.0 | | | |
| Argus WW | | | |
| Contractor ID | | | |
| Hydrophone +3C Geop. | | | |
| Airgun Array 1210 | | | |
| 10 | | | |
| 9 | | | |
| 0.7 | | | |
| Constant Gain | | | |
| Use parameters from GD | | | |
| | *Example of Message Transmission* | | |
| Setting | Message Sent | Chosen Ordinal | Corresponding Shot Time |
| N1 | Initial N Shot | 1 | 0.000 |
| N2 | | 1 | 10.000 |
| N3 | | 1 | 20.000 |
| N4 | | 1 | 30.000 |
| N5 | | 1 | 40.000 |
| N6 | | 1 | 50.000 |
| N7 | | 1 | 60.000 |
| N8 | | 1 | 70.000 |
| N9 | | 1 | 80.000 |
| N10 | Final N Shot | 1 | 90.000 |
| M1 | Send Travel Time Uphole | 1 | 100.000 |
| M2 | Send Quality Index Uphole | 1 | 110.000 |
| M3 | Send Probable Clock Drift Uphole | 1 | 120.000 |
| M4 | Send Probable Velocity Model Error Uphole | 1 | 130.000 |
| M5 | Send Battery Status Uphole | 1 | 140.000 |
| M6 | Activate Sonic WD Tool | 1 | 150.000 |
| M7 | Send Sonic Data Uphole | 1 | 160.000 |
| M8 | Do not activate WD Tool 3 | 0 | 170.000 |
| M9 | Do not send WD Tool 3 data uphole | 0 | 180.000 |

FIG. 15a

TABLE 2 (cont'd)
FIRST EXAMPLE OF APPLICATION OF PROJECT MENU FROM TABLE 1
Selected data to be sent uphole
Sonic WD tool to be activated
Other WD tool not to be activated

| Observed Corr. Coeff. | Shot? | Weighted Corr. Coeff. | Observed Raw Times | Nearest Time in Model | Delta to Model Times |
|---|---|---|---|---|---|
| 0.850 | 1 | 0.85 | 0.001 | 0.000 | 0.001 |
| 0.821 | 1 | 0.821 | 10.002 | 10.000 | 0.002 |
| 0.789 | 1 | 0.789 | 20.000 | 20.000 | 0.000 |
| 0.796 | 1 | 0.796 | 30.001 | 30.000 | 0.001 |
| 0.912 | 1 | 0.912 | 40.000 | 40.000 | 0.000 |
| 0.896 | 1 | 0.896 | 50.003 | 50.000 | 0.003 |
| 0.782 | 1 | 0.782 | 59.999 | 60.000 | -0.001 |
| 0.914 | 1 | 0.914 | 70.000 | 70.000 | 0.000 |
| 0.912 | 1 | 0.912 | 80.001 | 80.000 | 0.001 |
| 0.715 | 1 | 0.715 | 90.002 | 90.000 | 0.002 |
| 0.885 | 1 | 0.885 | 100.001 | 100.000 | 0.001 |
| 0.844 | 1 | 0.844 | 110.000 | 110.000 | 0.000 |
| 0.852 | 1 | 0.852 | 120.002 | 120.000 | 0.002 |
| 0.952 | 1 | 0.952 | 129.999 | 130.000 | -0.001 |
| 0.812 | 1 | 0.812 | 140.003 | 140.000 | 0.003 |
| 0.863 | 1 | 0.863 | 150.001 | 150.000 | 0.001 |
| 0.798 | 1 | 0.798 | 160.002 | 160.000 | 0.002 |
| 0.356 | 0 | 0 | NA | 170.000 | NA |
| 0.213 | 0 | 0 | NA | 180.000 | NA |
| | Identified is 1 | 0.84665 | | | Avg Delta 1.0 msec |
| | | Average Corr. Coeff. | | 0.000824 | Time Drift Est. |
| | | | | | Downhole Clock is 1.0 msec fast |

FIG. 15b

TABLE 2 (cont'd)
FIRST EXAMPLE OF APPLICATION OF PROJECT MENU FROM TABLE 1

Selected data to be sent uphole
Sonic WD tool to be activated
Other WD tool not to be activated    Settings

| | | | | Settings |
|---|---|---|---|---|
| | | These parameters | | Example Project 1 |
| | | are known by | | UTS=0.200 |
| | | default by the | | LT=6 |
| | | Process Controller | | BT=4 |
| | | | | CONTINUOUS |
| | | | | Noise<25 Mbars for 10 sec |
| | | | | impulsive |
| | | | | SP=1 msec |
| | | | | 12 HX Model 2 |
| | | | | Version 2.0 |
| | | | | Argus WW |
| | | | | Contractor ID |
| | | | | Hydrophone +3C Geop. |
| | | | | Airgun Array 1210 |
| | | | | 10 |
| | | | | 9 |
| | | | | 0.7 |
| | | | | Constant Gain |
| | | | | Use parameters from GD |
| *Example of Reception and Decoding of Message* | | | | |
| Corrected Times | Delta to Model Times | Ordinal Calculation | Settings Calculation | Interpreted Message |
| 0.000 | 0.000 | 1 | NA | 10 N SHOTS |
| 10.001 | 0.001 | 1 | NA | IDENTIFIED |
| 19.999 | -0.001 | 1 | NA | MEETS PROJECT SPECIFICATION |
| 30.000 | 0.000 | 1 | NA | |
| 39.999 | -0.001 | 1 | NA | |
| 50.002 | 0.002 | 1 | NA | |
| 59.998 | -0.002 | 1 | NA | |
| 69.999 | -0.001 | 1 | NA | |
| 80.000 | 0.000 | 1 | NA | |
| 90.001 | 0.001 | 1 | NA | |
| 100.000 | 0.000 | 1 | 1 | Send Travel Time Uphole |
| 109.999 | -0.001 | 1 | 1 | Send Quality Index Uphole |
| 120.001 | 0.001 | 1 | 1 | Send Probable Clock Drift Uphole |
| 129.998 | -0.002 | 1 | 1 | Send Probable Velocity Model Error Uphole |
| 140.002 | 0.002 | 1 | 1 | Send Battery Status Uphole |
| 150.000 | 0.000 | 1 | 1 | Activate Sonic WD Tool |
| 160.001 | 0.001 | 1 | 1 | Send Sonic Data Uphole |
| NA | NA | 0 | 0 | Do Not Activate WD Tool 3 |
| NA | NA | 0 | 0 | Do Not Send WD Tool 3 data uphole |
| | Std Dev=.1.22 msec | | | |
| 0.00122 | Std. Dev. is OK | | | Avg. Corr. Coeff. Is .85 |
| | | | | Quality Standards Met |
| | | | | Commands will be implemented!! |

FIG. 15c

TABLE 3

PROJECT MENU EXAMPLE DEMONSTRATING COMMUNICATION WITH A VSP TOOL, LINKED TO OTHER CONTROLLABLE TOOLS AND UTILIZING BINARY SEISMIC SIGNALS TOGETHER WITH TIME-SHIFTED SEISMIC SIGNALS ENABLING EFFICIENT COMMUNICATION OF NUMERICAL PARAMETERS

| Parameter Name | Symbol | Source | Project Fixed Parameters | | |
|---|---|---|---|---|---|
| | | | General Default | Allowed Values | Units |
| Project Name | PN | Project File | VSP BINARY ONLY | up to 64 characters | alphanumeric |
| SISS Unit Time Step | UTS | Project File | 0.200 | 0.005 to 0.500 in steps of 0.005 | seconds |
| Listen Time | LT | Project File | 6.000 | 0.500 to 25.000 in steps of 0.500 | seconds |
| Buffer Time | BT | Project File | 4.000 | 0.500 to 25.000 in steps of 0.500 | seconds |
| PTW Interval | ZPTW | Project File | CONTINUOUS | at integer multiples of 10.0000 sec | seconds |
| Start Time of First PTW | SPTW | Project File | NOISE CONTROLLED | WHEN NOISE < 25 Mbar for 10 sec | minutes |
| Sweep Length | RL | Project File | NA | impulsive source | seconds |
| Sample Period | SP | Project File | 1 millisecond | .50, 1, 2, 3, 4, 6 | milliseconds |
| VSPDAU Model Number | | General Menu | 1.2 HX Model 2 | 16 characters | alphanumeric |
| VSP Software Version | | Software | Version 2.0 | 16 characters | alphanumeric |
| Client Identification | | Project File | Argus WW | 64 characters | alphanumeric |
| Contractor Identification | | Project File | Contractor ID | 64 characters | alphanumeric |
| Receiver Types | RT | Project File | Hydrophone + 3C Geop. | 64 characters | alphanumeric |
| Source Types | | Project File | Airgun Array 1210 | 64 characters | alphanumeric |
| Number of Primary Shots | AEF | Project File | 10 | 32 characters | alphanumeric |
| Number of Secondary Shots | | Project File | 9 | 32 characters | |
| Minimum Correlation Coeff. | MINCC | Project File | 0.7 | 0 to 1 | none |
| Gain Mode for SISS DP | GM | Project File | Constant Gain | 16 characters | alphanumeric |
| Back Up Mode | BUM | Project File | Use parameters from GD | 32 characters | alphanumeric |
| Other General Parameters | | Project File | As defined | | |

*FIG. 16a*

TABLE 3 (cont'd)

PROJECT MENU EXAMPLE DEMONSTRATING COMMUNICATION WITH A VSP TOOL, LINKED TO OTHER CONTROLLABLE TOOLS AND UTILIZING BINARY SEISMIC SIGNALS TOGETHER WITH TIME-SHIFTED SEISMIC SIGNALS ENABLING EFFICIENT COMMUNICATION OF NUMERICAL PARAMETERS

| Parameter Name | Symbol | Shot ID | Variable Communicated Parameters | | Units | Maximum Ordinal Count | Cum. Max. Ordinal Count | Earliest Shot Time | Latest Shot Time |
|---|---|---|---|---|---|---|---|---|---|
| | | | General Default | Allowed Values | | | | | |
| Initial N Shot | N1 | 1 | No Default Allowed | 1 | integer | 1 | 1 | 0.000 | 0.000 |
| | N2 | 2 | No Default Allowed | 1 | integer | 1 | 2 | 10.000 | 10.000 |
| | N3 | 3 | No Default Allowed | 1 | integer | 1 | 3 | 20.000 | 20.000 |
| | N4 | 4 | No Default Allowed | 1 | integer | 1 | 4 | 30.000 | 30.000 |
| | N5 | 5 | No Default Allowed | 1 | integer | 1 | 5 | 40.000 | 40.000 |
| | N6 | 6 | No Default Allowed | 1 | integer | 1 | 6 | 50.000 | 50.000 |
| | N7 | 7 | No Default Allowed | 1 | integer | 1 | 7 | 60.000 | 60.000 |
| | N8 | 8 | No Default Allowed | 1 | integer | 1 | 8 | 70.000 | 70.000 |
| | N9 | 9 | No Default Allowed | 1 | integer | 1 | 9 | 80.000 | 80.000 |
| Final N Shot | N10 | 10 | No Default Allowed | 1 | integer | 1 | 10 | 90.000 | 90.000 |
| Send Travel Time Uphole | M1 | 11 | 0 | 1 or 0 | integer | 1 | 11 | 100.000 | 100.000 |
| Send Quality Index Uphole | M2 | 12 | 0 | 1 or 0 | integer | 1 | 12 | 110.000 | 110.000 |
| Send Probable Clock Drift Uphole | M3 | 13 | 0 | 1 or 0 | integer | 1 | 13 | 120.000 | 120.000 |
| Send Probable Velocity Model Error Uphole | M4 | 14 | 0 | 1 or 0 | integer | 1 | 14 | 130.000 | 130.000 |
| Current VSP Tool Position | M5 | 15 | 0 | 0 to 200 *UTS, UTS @ 100 ft | integer | 1 | 15 | 140.000 | 140.000 |
| Current Seismic Source Offset from Tool | M6 | 16 | 0 | 0 to 25*UTS, UTS @ 100 ft | integer | 1 | 16 | 154.000 | 154.500 |
| Uphole Estimate of Downhole Clock Drift | M7 | 17 | 0 | 0 to 400*UTS, UTS @ .25 msec drift | integer | 1 | 17 | 164.500 | 172.500 |
| Number of Shots in this Sequence | M8 | 18 | 0 | 0 to 25*UTS, UTS @ one shot | integer | 1 | 18 | 182.500 | 183.000 |
| Number of Shots in Next Sequence | M9 | 19 | 0 | 1 to 25*UTS, UTS @ one shot | integer | 1 | 19 | 193.000 | 193.500 |

*FIG. 16b*

TABLE 4
FIRST EXAMPLE OF APPLICATION OF PROJECT MENU FROM TABLE 3

| Settings | Selected data to be sent uphole Sonic WD tool to be activated WD tool not to be activated | | |
|---|---|---|---|
| Example Project 1 | These parameters | | |
| UTS=0.200 | are not transmitted | | |
| LT=6 | | | |
| BT=4 | | | |
| CONTINUOUS | | | |
| Noise<25 Mbars for 10 sec | | | |
| impulsive | | | |
| SP=1 msec | | | |
| 12 HX Model 2 | | | |
| Version 2.0 | | | |
| Argus WW | | | |
| Contractor ID | | | |
| Hydrophone +3C Geop. | | | |
| Airgun Array 1210 | | | |
| 10 | | | |
| 9 | | | |
| 0.7 | | | |
| Constant Gain | | | |
| Use parameters from GD | | | |
| | *Example of Message Transmission* | | |
| Setting | Message Sent | Chosen Ordinal | Corresponding Shot Time |
| N1 | Initial N Shot | 1 | 0.000 |
| N2 | | 1 | 10.000 |
| N3 | | 1 | 20.000 |
| N4 | | 1 | 30.000 |
| N5 | | 1 | 40.000 |
| N6 | | 1 | 50.000 |
| N7 | | 1 | 60.000 |
| N8 | | 1 | 70.000 |
| N9 | | 1 | 80.000 |
| N10 | Final N Shot | 1 | 90.000 |
| M1 | Send Travel Time Uphole | 1 | 100.000 |
| M2 | Send Quality Index Uphole | 1 | 110.000 |
| M3 | Send Probable Clock Drift Uphole | 1 | 120.000 |
| M4 | Send Probable Velocity Model Error Uphole | 1 | 130.000 |
| M5 | Current Tool Position at 12200 ft | 1 | 142.440 |
| M6 | Current Seismic Source Offset at 1300 ft | 1 | 154.260 |
| M7 | Downhole Clock Drift is 1.00 msec fast | 1 | 169.300 |
| M8 | 19 shots in this sequence | 1 | 182.880 |
| M9 | 19 shots planned for next sequence | 1 | 193.380 |

FIG. 17a

TABLE 4 (cont'd)
FIRST EXAMPLE OF APPLICATION OF PROJECT MENU FROM TABLE 3
Selected data to be sent uphole
Sonic WD tool to be activated
WD tool not to be activated

| Observed Corr. Coeff. | Shot? | Weighted Corr. Coeff. | Observed Raw Times | Nearest Time in Model | Delta to Model Times |
|---|---|---|---|---|---|
| 0.850 | 1 | 0.85 | 0.001 | 0.000 | 0.001 |
| 0.821 | 1 | 0.821 | 10.002 | 10.000 | 0.002 |
| 0.789 | 1 | 0.789 | 20.000 | 20.000 | 0.000 |
| 0.796 | 1 | 0.796 | 30.001 | 30.000 | 0.001 |
| 0.912 | 1 | 0.912 | 40.000 | 40.000 | 0.000 |
| 0.896 | 1 | 0.896 | 50.003 | 50.000 | 0.003 |
| 0.782 | 1 | 0.782 | 59.999 | 60.000 | -0.001 |
| 0.914 | 1 | 0.914 | 70.000 | 70.000 | 0.000 |
| 0.912 | 1 | 0.912 | 80.001 | 80.000 | 0.001 |
| 0.715 | 1 | 0.715 | 90.002 | 90.000 | 0.002 |
| 0.885 | 1 | 0.885 | 100.001 | 100.000 | 0.001 |
| 0.844 | 1 | 0.844 | 110.000 | 110.000 | 0.000 |
| 0.852 | 1 | 0.852 | 120.002 | 120.000 | 0.002 |
| 0.952 | 1 | 0.952 | 129.999 | 130.000 | -0.001 |
| 0.812 | 1 | 0.812 | 142.441 | 142.440 | 0.001 |
| 0.863 | 1 | 0.863 | 154.260 | 154.260 | 0.000 |
| 0.798 | 1 | 0.798 | 169.303 | 169.300 | 0.003 |
| 0.908 | 1 | 0.908 | 182.882 | 182.880 | 0.002 |
| 0.856 | 1 | 0.856 | 193.382 | 193.380 | 0.002 |
|  | Identified is 1 | 0.85037 Average Corr. Coeff. |  | 0.001000 | Avg Delta 1.0 msec Time Drift Est. Downhole Clock is 1.0 msec fast |

FIG. 17b

TABLE 4 (cont'd)
FIRST EXAMPLE OF APPLICATION OF PROJECT MENU FROM TABLE 3

| | | Selected data to be sent uphole | | |
| | | Sonic WD tool to be activated | | |
| | | WD tool not to be activated | | Settings |
|---|---|---|---|---|
| | | These parameters | | Example Project 1 |
| | | are known by | | UTS=0.200 |
| | | default by the | | LT=6 |
| | | Process Controller | | BT=4 |
| | | | | CONTINUOUS |
| | | | | Noise<25 Mbars for 10 sec |
| | | | | impulsive |
| | | | | SP=1 msec |
| | | | | 12 HX Model 2 |
| | | | | Version 2.0 |
| | | | | Argus WW |
| | | | | Contractor ID |
| | | | | Hydrophone +3C Geop. |
| | | | | Airgun Array 1210 |
| | | | | 10 |
| | | | | 9 |
| | | | | 0.7 |
| | | | | Constant Gain |
| | | | | Use parameters from GD |

Example of Reception and Decoding of Message

| Corrected Times | Delta to Model Times | Ordinal Calculation | Settings Calculation | Interpreted Message |
|---|---|---|---|---|
| 0.000 | 0.000 | 1 | NA | 10 N SHOTS |
| 10.001 | 0.001 | 1 | NA | IDENTIFIED |
| 19.999 | -0.001 | 1 | NA | MEETS PROJECT SPECIFICATION |
| 30.000 | 0.000 | 1 | NA | |
| 39.999 | -0.001 | 1 | NA | |
| 50.002 | 0.002 | 1 | NA | |
| 59.998 | -0.002 | 1 | NA | |
| 69.999 | -0.001 | 1 | NA | |
| 80.000 | 0.000 | 1 | NA | |
| 90.001 | 0.001 | 1 | NA | |
| 100.000 | 0.000 | 1 | 1 | Send Travel Time Uphole |
| 109.999 | -0.001 | 1 | 1 | Send Quality Index Uphole |
| 120.001 | 0.001 | 1 | 1 | Send Probable Clock Drift Uphole |
| 129.998 | -0.002 | 1 | 1 | Send Probable Velocity Model Error Uphole |
| 142.440 | 0.000 | 122 | 12200 ft. | VSP Tool is 12200 ft along borehole |
| 154.259 | -0.001 | 13 | 1300 ft | Seismic Source is Offset 1300 ft |
| 169.302 | 0.002 | 4 | 1.000 msec fast | Downhole Clock was Estimated 1.00 msec fast |
| 182.881 | 0.001 | 19 | 19 shots | 19 shots in current sequence |
| 193.381 | 0.001 | 19 | 19 shots | 19 shots planned for next sequence |
| | Std Dev=.1.22 msec | | | Std Dev=.1.22 msec |
| 0.00122 | Std. Dev. is OK | | | Avg. Corr. Coeff. Is .85 |
| | | | | Quality Standards Met |
| | | | | Commands will be implemented!! |

FIG. 17c

TABLE 5

PROJECT MENU EXAMPLE DEMONSTRATING COMMUNICATION WITH A VSP TOOL, LINKED TO OTHER CONTROLLABLE TOOLS AND UTILIZING BINARY SEISMIC SIGNALS TOGETHER WITH ACTIVATION AND PAUSING OF DRILL ROTATION AS AN ADDITIONAL SIGNALING MEANS

| Parameter Name | Symbol | Source | General Default | Allowed Values | Units |
|---|---|---|---|---|---|
| Project Fixed Parameters | | | | | |
| Project Name | PN | Project File | VSP BINARY ONLY | up to 64 characters | alphanumeric |
| SISS Unit Time Step | UTS | Project File | 0.200 | 0.005 to 0.500 in steps of 0.005 | seconds |
| Listen Time | LT | Project File | 6.000 | 0.500 to 25.000 in steps of 0.500 | seconds |
| Buffer Time | BT | Project File | 4.000 | 0.500 to 25.000 in steps of 0.500 | seconds |
| PTW Interval | ZPTW | Project File | CONTINUOUS | at integer multiples of 10.0000 sec | seconds |
| Start Time of First PTW | SPTW | Project File | NOISE CONTROLLED | WHEN NOISE < 25 Mbar for 10 sec | minutes |
| Sweep Length | RL | Project File | NA | impulsive source | seconds |
| Sample Period | SP | Project File | 1 millisecond | .50, 1, 2, 3, 4, 6 | milliseconds |
| VSPDAU Model Number | | General Menu | 1.2 HX Model 2 | 16 characters | alphanumeric |
| VSP Software Version | | Software | Version 2.0 | 16 characters | alphanumeric |
| Client Identification | | Project File | Argus WW | 64 characters | alphanumeric |
| Contractor Identification | | Project File | Contractor ID | 64 characters | alphanumeric |
| Receiver Types | RT | Project File | Hydrophone + 3C Geop. | 64 characters | alphanumeric |
| Source Types | | Project File | Airgun Array 1210 | 64 characters | alphanumeric |
| Number of Primary Shots | AEF | Project File | 10 | 32 characters | alphanumeric |
| Number of Secondary Shots | | Project File | 9 | 32 characters | alphanumeric |
| Minimum Correlation Coeff. | MINCC | Project File | 0.7 | 0 to 1 | none |
| Gain Mode for SISS DP | GM | Project File | Constant Gain | 16 characters | alphanumeric |
| Drill Signal | DR | Project File | 120 sec of drill signal | 32 characters | alphanumeric |
| Other General Parameters | | Project File | As defined | | |

*FIG. 18a*

TABLE 5 (cont'd)

PROJECT MENU EXAMPLE DEMONSTRATING COMMUNICATION WITH A VSP TOOL, LINKED TO OTHER CONTROLLABLE TOOLS AND UTILIZING BINARY SEISMIC SIGNALS TOGETHER WITH ACTIVATION AND PAUSING OF DRILL ROTATION AS AN ADDITIONAL SIGNALING MEANS

| Parameter Name | Symbol | Shot ID | Variable Communicated Parameters | | | Maximum Ordinal Count | Cum. Max. Ordinal Count | Earliest Shot Time | Latest Shot Time |
|---|---|---|---|---|---|---|---|---|---|
| | | | General Default | Allowed Values | Units | | | | |
| Drilling Pause 1 | DRP30-1 | Pause Drilling 1 | No Drilling | 0 | integer | | | 0 | 5 |
| Drilling for 30 sec-1 | DR30-1 | Drilling 1 | No Drilling | 1 or 0 | integer | | | 25 | 35 |
| Drilling Pause 2 | DRP30-2 | Pause Drilling 2 | No Drilling | 0 | integer | | | 55 | 65 |
| Drilling for 30 sec-2 | DR30-2 | Drilling 2 | No Drilling | 1 or 0 | integer | | | 85 | 95 |
| Drilling Pause 3 | DRP30-3 | Pause Drilling 3 | No Drilling | 0 | integer | | | 115 | 125 |
| Initial N Shot | N1 | 1 | No Default Allowed | 1 | integer | 1 | 1 | 125.000 | 125.000 |
| | N2 | 2 | No Default Allowed | 1 | integer | 1 | 2 | 135.000 | 10.000 |
| | N3 | 3 | No Default Allowed | 1 | integer | 1 | 3 | 145.000 | 20.000 |
| | N4 | 4 | No Default Allowed | 1 | integer | 1 | 4 | 155.000 | 155.000 |
| | N5 | 5 | No Default Allowed | 1 | integer | 1 | 5 | 165.000 | 165.000 |
| | N6 | 6 | No Default Allowed | 1 | integer | 1 | 6 | 175.000 | 175.000 |
| | N7 | 7 | No Default Allowed | 1 | integer | 1 | 7 | 185.000 | 185.000 |
| | N8 | 8 | No Default Allowed | 1 | integer | 1 | 8 | 195.000 | 195.000 |
| | N9 | 9 | No Default Allowed | 1 | integer | 1 | 9 | 205.000 | 205.000 |
| Final N Shot | N10 | 10 | No Default Allowed | 1 | integer | 1 | 10 | 215.000 | 215.000 |
| Send Travel Time Uphole | M1 | 11 | 0 | 1 or 0 | integer | 1 | 11 | 225.000 | 225.000 |
| Send Quality Index Uphole | M2 | 12 | 0 | 1 or 0 | integer | 1 | 12 | 235.000 | 235.000 |
| Send Probable Clock Drift Uphole | M3 | 13 | 0 | 1 or 0 | integer | 1 | 13 | 245.000 | 245.000 |
| Send Probable Velocity Model Error Uphole | M4 | 14 | 0 | 1 or 0 | integer | 1 | 14 | 255.000 | 255.000 |
| Send Battery Status Uphole | M5 | 15 | 0 | 1 or 0 | integer | 1 | 15 | 265.000 | 265.000 |
| Activate/Deactivate Sonic WD Tool | M6 | 16 | 0 | 1 or 0 | integer | 1 | 16 | 275.000 | 275.000 |
| Send Sonic Data Uphole | M7 | 17 | 0 | 1 or 0 | integer | 1 | 17 | 285.000 | 285.000 |
| Activate/Deactivate WD Tool 3 | M8 | 18 | 0 | 1 or 0 | integer | 1 | 18 | 295.000 | 295.000 |
| Send WD Tool 3 Data Uphole | M9 | 19 | 0 | 1 or 0 | integer | 1 | 19 | 305.000 | 305.000 |

FIG. 18b

TABLE 6
FIRST EXAMPLE OF APPLICATION OF PROJECT MENU FROM TABLE 5

| Settings | Selected data to be sent uphole<br>Sonic WD tool to be activated<br>WD tool not to be activated | | |
|---|---|---|---|
| Example Project 1 | These parameters | | |
| UTS=0.200 | are not transmitted. | | |
| LT=6 | | | |
| BT=4 | | | |
| CONTINUOUS | | | |
| Noise<25 Mbars for 10 sec | | | |
| impulsive | | | |
| SP=1 msec | | | |
| 12 HX Model 2 | | | |
| Version 2.0 | | | |
| Argus WW | | | |
| Contractor ID | | | |
| Hydrophone +3C Geop. | | | |
| Airgun Array 1210 | | | |
| 10 | | | |
| 9 | | | |
| 0.7 | | | |
| Constant Gain | | | |
| Drill 30 sec, Stop 30 sec, Drill 30 sec, Stop 30 sec | | | |

Example of Message Transmission

| Setting | Message Sent | Chosen Ordinal | Corresponding Shot Time |
|---|---|---|---|
| 0 | Pause matches menu duration of 30 sec | 0 | NA |
| 1 | Drilling matches menu duration of 30 sec | 1 | NA |
| 0 | Pause matches menu duration of 30 sec | 0 | NA |
| 1 | Drilling matches menu duration of 30 sec | 1 | NA |
| 0 | Pause matches menu duration of 30 sec | 0 | NA |
| N1 | Initial N Shot | 1 | 0.000 |
| N2 | | 1 | 10.000 |
| N3 | | 1 | 20.000 |
| N4 | | 1 | 30.000 |
| N5 | | 1 | 40.000 |
| N6 | | 1 | 50.000 |
| N7 | | 1 | 60.000 |
| N8 | | 1 | 70.000 |
| N9 | | 1 | 80.000 |
| N10 | Final N Shot | 1 | 90.000 |
| M1 | Send Travel Time Uphole | 1 | 100.000 |
| M2 | Send Quality Index Uphole | 1 | 110.000 |
| M3 | Send Probable Clock Drift Uphole | 1 | 120.000 |
| M4 | Send Probable Velocity Model Error Uphole | 1 | 130.000 |
| M5 | Send Battery Status Uphole | 1 | 140.000 |
| M6 | Activate Sonic WD Tool | 1 | 150.000 |
| M7 | Send Sonic Data Uphole | 1 | 160.000 |
| M8 | Do not activate WD Tool 3 | 0 | 170.000 |
| M9 | Do not send WD Tool 3 data uphole | 0 | 180.000 |

FIG. 19a

TABLE 6 (cont'd)
FIRST EXAMPLE OF APPLICATION OF PROJECT MENU FROM TABLE 5

Selected data to be sent uphole
Sonic WD tool to be activated
WD tool not to be activated

| Observed Corr. Coeff. | Shot? | Weighted Corr. Coeff. | Observed Raw Times | Nearest Time in Model | Delta to Model Times |
|---|---|---|---|---|---|
| NA | NA | NA | NA | NA | NA |
| NA | NA | NA | NA | NA | NA |
| NA | NA | NA | NA | NA | NA |
| NA | NA | NA | NA | NA | NA |
| NA | NA | NA | NA | NA | NA |
| 0.850 | 1 | 0.85 | 0.001 | 0.000 | 0.001 |
| 0.821 | 1 | 0.821 | 10.002 | 10.000 | 0.002 |
| 0.789 | 1 | 0.789 | 20.000 | 20.000 | 0.000 |
| 0.796 | 1 | 0.796 | 30.001 | 30.000 | 0.001 |
| 0.912 | 1 | 0.912 | 40.000 | 40.000 | 0.000 |
| 0.896 | 1 | 0.896 | 50.003 | 50.000 | 0.003 |
| 0.782 | 1 | 0.782 | 59.999 | 60.000 | -0.001 |
| 0.914 | 1 | 0.914 | 70.000 | 70.000 | 0.000 |
| 0.912 | 1 | 0.912 | 80.001 | 80.000 | 0.001 |
| 0.715 | 1 | 0.715 | 90.002 | 90.000 | 0.002 |
| 0.885 | 1 | 0.885 | 100.001 | 100.000 | 0.001 |
| 0.844 | 1 | 0.844 | 110.000 | 110.000 | 0.000 |
| 0.852 | 1 | 0.852 | 120.002 | 120.000 | 0.002 |
| 0.952 | 1 | 0.952 | 129.999 | 130.000 | -0.001 |
| 0.812 | 1 | 0.812 | 140.003 | 140.000 | 0.003 |
| 0.356 | 0 | 0 | NA | 150.000 | NA |
| 0.213 | 0 | 0 | NA | 160.000 | NA |
| 0.863 | 1 | 0.863 | 170.001 | 170.000 | 0.001 |
| 0.798 | 1 | 0.798 | 180.002 | 180.000 | 0.002 |
|  | Identified is 1 | 0.84665 Average Corr. Coeff. |  | 0.000824 | Avg Delta 1.0 msec Time Drift Est. Downhole Clock is 1.0 msec fast |

FIG. 19b

TABLE 6 (cont'd)
FIRST EXAMPLE OF APPLICATION OF PROJECT MENU FROM TABLE 5

Selected data to be sent uphole
Sonic WD tool to be activated
WD tool not to be activated        Settings

| | | | | Settings |
|---|---|---|---|---|
| | | These parameters | | Example Project 1 |
| | | are known by | | UTS=0.200 |
| | | default by the | | LT=6 |
| | | Process Controller | | BT=4 |
| | | | | CONTINUOUS |
| | | | | Noise<25 Mbars for 10 sec |
| | | | | impulsive |
| | | | | SP=1 msec |
| | | | | 12 HX Model 2 |
| | | | | Version 2.0 |
| | | | | Argus WW |
| | | | | Contractor ID |
| | | | | Hydrophone +3C Geop. |
| | | | | Airgun Array 1210 |
| | | | | 10 |
| | | | | 9 |
| | | | | 0.7 |
| | | | | Constant Gain |
| | | | | Use parameters from GD |

*Example of Reception and Decoding of Message*

| Corrected Times | Delta to Model Times | Ordinal Calculation | Settings Calculation | Interpreted Message |
|---|---|---|---|---|
| NA | <5 sec | 0 | 0 | Seismic Shots Follow the third 30 sec pause |
| NA | <5 sec | 1 | 1 | in Drilling |
| NA | <5 sec | 0 | 0 | Turn on the Seismic Recorder! |
| NA | <5 sec | 1 | 1 | |
| NA | <5 sec | 0 | 0 | |
| 0.000 | 0.000 | 1 | NA | 10 N SHOTS |
| 10.001 | 0.001 | 1 | NA | IDENTIFIED |
| 19.999 | -0.001 | 1 | NA | MEETS PROJECT SPECIFICATION |
| 30.000 | 0.000 | 1 | NA | |
| 39.999 | -0.001 | 1 | NA | |
| 50.002 | 0.002 | 1 | NA | |
| 59.998 | -0.002 | 1 | NA | |
| 69.999 | -0.001 | 1 | NA | |
| 80.000 | 0.000 | 1 | NA | |
| 90.001 | 0.001 | 1 | NA | |
| 100.000 | 0.000 | 1 | 1 | Send Travel Time Uphole |
| 109.999 | -0.001 | 1 | 1 | Send Quality Index Uphole |
| 120.001 | 0.001 | 1 | 1 | Send Probable Clock Drift Uphole |
| 129.998 | -0.002 | 1 | 1 | Send Probable Velocity Model Error Uphole |
| 140.002 | 0.002 | 1 | 1 | Send Battery Status Uphole |
| NA | NA | 0 | 0 | Do Not Activate Sonic WD Tool |
| NA | NA | 0 | 0 | Do Not Send Sonic Data Uphole |
| 170.000 | 0.000 | 1 | 1 | Activate WD Tool 3 |
| 180.001 | 0.001 | 1 | 1 | Send WD Tool 3 data uphole |
| | Std Dev=.1.22 msec | | | Drilling Pause sequence is duly followed by shots |
| 0.00128 | Std. Dev. is OK | | | Avg. Corr. Coeff. Is .85 |
| | | | | Quality Standards Met |
| | | | | Commands will be implemented!! |

FIG. 19c

VERTICAL SEISMIC PROFILING METHOD UTILIZING SEISMIC COMMUNICATION AND SYNCHRONIZATION

CROSS-REFERENCE TO RELATED APPLICATIONS

This Application is a division of application Ser. No. 11/370,620 filed Mar. 8, 2006. Said application Ser. No. 11/370,620 claims the benefit of U.S. Provisional Application No. 60/660,026 Filed Mar. 9, 2005.

BACKGROUND OF THE INVENTION

1. Field of the Invention

The present invention relates to novel while-drilling Vertical Seismic Profiling (VSP) methods and equipment. One aspect of the invention pertains to measuring and correcting the drift of a downhole clock associated with the VSP receiver in the borehole. Another aspect relates to communication from the surface to while-drilling logging tools in a borehole and to the control of these tools by commands and information sent from the surface by seismic signals and/or by special utilization of surface controllable drilling processes.

2. Description of Related Art

Those in the petroleum industry are increasingly concerned with 'logging-while-drilling' (LWD) or 'measuring-while-drilling' (MWD) methods that allow early access to information about the geologic and fluid conditions surrounding the borehole as the drilling progresses and during extraction of the drill string from the hole. The LWD and MWD methods are collectively referred to as 'while-drilling' methods in this specification. Knowing such information while the drilling process is actively progressing allows decisions to be made that may have a very large impact in terms of attainment of project objectives including petroleum productivity and constraint of project cost. Vertical seismic profiling (VSP) methods have, in the past, been only practicable after the drill string was extracted from the borehole. More recent technology has, to some degree, obviated this requirement. The introduction of several new methods has made it possible to acquire VSP surveys as drilling progresses. However, these new methods have suffered from limitations. One important limitation is the lack of sufficiently accurate time-keeping in the downhole tool: as the downhole clock drifts relative to the master clock at the surface, error accumulates in the seismic travel time measurements that can be very detrimental to the VSP processing and resultant geologic information. Typically, prior art methods have been limited to time-keeping within about 2 milliseconds of true time. VSP surveys could provide significantly better results if time-keeping could be within ½ milliseconds of true time.

The rotation of the drill bit creates seismic energy that can be utilized as a means of illuminating the subsurface geology. If recorded at the surface of the earth, drill bit energy may provide VSP survey information. However this technique does not always work effectively. For example, when drilling soft formations insufficient seismic energy for imaging may be transferred to the in situ formation. Other methods that utilize a surface seismic source combined with seismic receivers in a tool located near to the drill bit in the drill string have been devised and are used. Such methods are designated as 'while-drilling VSP methods' in this document. These "while-drilling VSP methods" in the general case and as defined in this specification, may include methods that are applied during pauses in actual drilling and also during pauses in the process of extraction of the drill string or re-insertion of the drill string into the borehole, as is required for replacing drill bits or other reasons.

The seismic receiver package (called VSP receiver hereafter) incorporates seismic and other sensors combined with processing means and is capable of acquiring the VSP seismic data during periods when drilling motion, drilling fluid flow and attendant seismic noise have temporarily abated. The VSP receiver is normally battery powered and is not connected to the surface by wire or fiber conductors that might provide communication to or from the surface.

Complex control signals could readily be conducted to the seismic receiver from the surface by electrical wire or fiber optic link if either were available. However, when a drilling operation is underway it is inconvenient or impractical to provide these physical linkages from the surface to devices deep in the borehole via the drill string.

Other methods have also been sought to transmit control signals to such downhole devices. Electromagnetic communication through the earth between the surface and locations in a borehole has been utilized by the mining and petroleum industries. However, this method is subject to limitations imposed by highly-resistive rock formations and by deep boreholes. Electromagnetic wave signal strength is weakened as formation resistivity in the intervening earth increases. Electromagnetic noise may also prevent successful communication. Hardware in the wellbore such as surface casing and the drill string may interfere with signal reception. Deep boreholes imply high temperature and high pressure conditions, as well as requiring longer signal transmission distances and are not amenable to the application of existing electromagnetic communication systems.

Because of the paucity of opportunity to communicate to the downhole seismic receiver package in prior art while-drilling VSP systems, the seismic receivers have been designed and programmed to operate autonomously, without control by a surface operator for extended periods while downhole. A capability for selective transmission of limited amounts of data (such as observed seismic travel time) from the seismic receiver to the surface via the borehole can be pre-programmed, the corresponding software loaded into a tool at the surface and implemented using an uphole signaling means. One such uphole signaling means is called mud pulse telemetry and utilizes pressure pulses in the circulating borehole fluid (drilling mud) generated by a signal generator device near the drill bit called a mud siren. In conjunction with mud pulse telemetry or other uphole signaling means, a data-on-demand process would be invaluable in that vitally needed data could be requested at any time, but this capability would require a means of sending a command to the mud pulse signal generator tool via the seismic receiver package or dynamically controlling it in some other way.

It would be advantageous to be able to have at least a limited communication with the VSP receiver from the surface while conducting a simultaneous drilling and VSP data acquisition project so that the VSP receiver's operation could be altered in light of new information, such as might be gleaned from the seismic travel times transmitted using mud pulse telemetry. Other LWD and MWD systems also could benefit from such a capability to alter their operations upon demand as drilling progresses. Preferably, the entire drilling and concurrent logging process could be made an adaptive instead of simply a pre-planned operation that is unable to respond to unanticipated drilling conditions and changes in the geologic and fluid models based upon new knowledge gained while drilling. The reward would be in terms of increased probability of drilling success and significantly greater economic return.

As mentioned in the opening paragraph of this section, a synchronization problem has limited the effectiveness and value of VSP surveys conducted with the VSP receiver incommunicado with the surface (except for limited uphole communication via mud pulse telemetry). In seismic imaging and seismic velocity field determination, it is desirable to know seismic travel times to at least the nearest millisecond and preferably to the nearest ½ millisecond. This level of travel time precision necessitates provision of a precision clock as a component of the downhole seismic receiver package. A pre-mission synchronization of the downhole clock with the master clock at the surface ensures that both clocks commence the VSP data acquisition mission in exact agreement as to current time. A post mission re-synchronization allows measurement of total clock drift during the downhole episode and estimates of drift at intermediate times can be interpolated; however this is not sufficiently accurate as the drift rate may not have held constant throughout the downhole mission. The surface clock may be an extremely precise clock because there is no effective limitation on power, cost or physical packaging of the clock, and furthermore it may be periodically updated with other more precise time references such as GPS time. However the downhole clock has limitations imposed because of the environment in which it must operate. Extremes of pressure and temperature in which it must continue to operate with high precision, physical constraints of the deep borehole environment, along with a potentially limited power budget for lengthy downhole missions, have mandated that a clock with less precision than desired must be chosen. While a precision of 10 to the minus $8^{th}$ power would be considered sufficiently precise for most applications it is not sufficiently precise for the VSP application because it would mean that an error of 1 millisecond could build up in 28 hours. For VSP, the downhole clock needs to be within ½ millisecond of the master clock at all times during the survey and the clock may need to operate downhole for a period of several days or more.

Several prior art methods of synchronizing a downhole VSP clock to a surface clock have been disclosed to utilize sonic signals traveling along a borehole. VSP tools as described in U.S. Pat. No. 5,555,220, or in EP 01464991A (A1), or in WO 00/13043 or in U.S. Pat. No. 6,308,137 have an unfulfilled need for highly accurate synchronization (½ millisecond) of the downhole clock (associated with the downhole seismic receiver) to the surface clock (associated with the seismic source and surface seismic receiver).

U.S. Pat. No. 6,424,595 describes a synchronization method having a "pinger" at the borehole wellhead transmitting signal pulses along a drilling mud column to a downhole "pinger receiver". Although the '595 procedure accomplishes synchronization, it suffers from precision problems (2 msec) and requires additional equipment (the pinger and pinger-receiver at the surface and downhole). The pinger may not provide sufficient signal strength to allow detection of the reflected pulse and may risk damage to the pipe near the well head that is pinged. Results are not available until the tool is retrieved whereas it is useful and desirable to know the one-way seismic travel time as drilling progresses.

The disclosure of WO 00/13043 describes a method of clock synchronization that includes the transmission of acoustic pulses down a pipe within a wellbore at predetermined times, can also send the current position in the hole to the downhole receiver with acoustic signals, and is able to perform synchronization at the receiver using this approach. Limitations of this solution are accuracy of the acoustic travel time assumption, ability to receive the acoustic signals at significant depth and requirement for the acoustic system (additional equipment and operational considerations).

U.S. Pat. No. 6,308,137 describes a method of seismic signal communication with a downhole well tool. Although the U.S. Pat. No. 6,308,137 disclosure relies upon a high precision downhole clock synchronized to a surface clock, the description includes no accommodation for drift from synchronization.

U.S. Pat. No. 6,002,640 discloses a method of synchronizing a first clock that is associated with a surface positioned seismic receiver to a second clock that is associated with a surface positioned seismic source with the notation that either the receiver or the source may be downhole or in a mine. U.S. Pat. No. 6,584,406 claims an identical method of synchronization but as applied to the case of a downhole seismic receiver associated with a controllable tool. Neither of these two patents specifically describes application of the synchronization method to VSP data acquisition. However, the provisional patent application associated with U.S. Pat. No. 6,002,640 states that the method of the invention can be applied to VSP.

The VSP receiver could also be controlled from the surface, using the methods of these same two patents, to improve its operational performance and capabilities. The same seismic signals could be used to simultaneously control as well as to synchronize the tool. Moreover, these same seismic signals constitute the data that serve the objective of the VSP survey by providing the sought information relevant to the geologic conditions around the borehole. No other method has heretofore been described or patented that can with the very same seismic shots perform these three functions: (1) synchronization of receiver with the seismic source, (2) control of the processes in the seismic receiver and connected tools, and (3) provision of seismic data for the VSP travel time and imaging calculations.

Other MWD tools in proximity to the seismic receiver can also be advantageously controlled by the seismic signals, using the same methods as for control of the VSP receiver. The shots used for control of auxiliary tools may also have the multiple uses described above, i.e. they can also be used at the same time for synchronization of the downhole clock and provision of seismic data for the VSP purposes.

Thus there is a need in the petroleum extraction industry for a method that could overcome the deficiencies of currently available while-drilling vertical seismic profiling systems. This method could provide re-synchronization of the downhole clock while the drill string is in the hole, while simultaneously exercising a wide range of control commands and parameter settings for the downhole VSP receiver and also associated while-drilling logging tools, and would be efficient as well as very reliable. This ideal while-drilling VSP method could also provide information such as seismic travel times, clock drift and an indication of whether a command was received downhole by uphole signaling utilizing mud pulse telemetry or other means.

Certain terms are used in this specification that conform to industry vernacular but require definitions to ensure unambiguous communication. These terms are defined as follows:

SHOT: means a "seismic shot"; used interchangeably with "seismic shot".

SEISMIC SHOT: defined as (1) the deliberate act of creating seismic energy by a controlled seismic source at a source location in or on the earth; and (2) also is used to refer to the manifestations of that seismic energy as may be received and recorded at various locations away from the site of origin. For example, a "shot" may mean the received and digitized wave energy of the seismic shot as in "the shot was processed by cross-correlating with a prior shot."

SHOT TIME or SHOT INITIATION TIME or INITIATION TIME: defined as the time of initiation of the earliest seismic energy of the seismic shot at the point of origin.

SEISMIC TRAVEL TIME or TRAVEL TIME: the time period from the shot initiation time to the time of arrival of the first seismic energy at the VSP receiver in the borehole.

SEISMIC SOURCE: refers to the mechanism for creation of the seismic energy. There are two classes of seismic sources, (1) those that are impulsive sources, meaning that substantially all of the energy is initiated in a very short time window, e.g. less than 300 milliseconds, and (2) those that are non-impulsive. The impulsive seismic sources are exemplified by explosive sources and by an airgun source. The non-impulsive sources are typified by the vibratory sources (called Vibroseis in the industry) that create seismic energy continuously over a time period that is typically 5 to 50 seconds in duration. In this document a shot can be initiated by either an impulsive source or a non-impulsive source.

SHOT POINT: is the term used to denote the position of the seismic source when a seismic shot occurs.

FIXED SITE: an area of limited size in which one or more repeatable seismic sources can be located.

REPEATABLE SEISMIC SOURCE: A seismic source that

A. can be activated to transmit a seismic wave form into the earth or into the water layer near the surface of the earth, and B. can be re-activated again and again, after brief interludes of a few seconds duration, to transmit the same or substantially the same waveform, and C. whereby the location of the seismic source for the initial activation and for each subsequent activation is substantially the same so that D. the seismic wave profile from all of the nearly identical transmissions will be nearly identical when observed under sufficiently low ambient noise conditions at a point arbitrarily positioned on or in the earth in proximity to the seismic source.

SUBSTANTIALLY REPEATABLE SEISMIC SOURCE: A repeatable seismic source that achieves nearly identical wave profiles under given conditions wherein cross-correlation coefficients exceed 0.7 and standard deviation of cross-correlation peak times is less than 5 milliseconds.

SUMMARY OF THE INVENTION

A preferred embodiment of the invention is a while-drilling VSP system suitable to utilize seismic energy generated by a surface source to (1) communicate information to a VSP receiver located near to the drill bit while the same seismic energy (in the form of seismic shots or pulses) provides (2) a re-synchronization means to correct the downhole clock associated with the VSP receiver to the master clock at the surface and also provides in the same shots (3) seismic data required for the VSP survey. The VSP receiver contains a processor that may also be linked to other while-drilling logging tools or other controllable devices near the drill bit so that commands can be transmitted from the surface and conveyed via the VSP receiver's processor to the associated tools. The associated tools if suitably configured can thus alter their operations in response to instructions transmitted via seismic signals from the surface.

Repeated seismic shots generated from the same surface location near the borehole are a normal requirement in prior art VSP surveys. The repetition of shots provides an opportunity for measurement of drift of the downhole clock associated with the seismic receiver package and also for communication of instructions or other information to the seismic receiver's processor. Seismic shots are initiated at certain selected pre-determined times known as times of potential shots to the downhole processor. Shots will normally be taken only when active drilling and pumping of drilling fluid has ceased, for example such as occurs during the addition or removal of a drill pipe section or when drilling is deliberately paused at a point in the geologic section of particular interest.

Communication protocols may be based on deliberately imposed time delays of shots and/or a binary shot/no-shot coding. The binary method can include a coding in which the number of consecutive shots taken signifies the communicated information.

Cross-correlation is applied to recorded data using a reference function that may be formed by combining other potential or known shots from the same or an adjacent receiver position and initiated from the same source location. The cross-correlation is analyzed to determine presence/absence of signal from the potential shot and to measure any time delay used for communication. A best rendition of the seismic signal for the current receiver location is formed by combining the detected shots for the location. Iterations of cross-correlation and reference-forming may be applied yielding successively more accurate and noise-free estimates of travel time and deliberately imposed delays as well as improved representations of seismic energy for VSP analysis.

Other means may be utilized to augment the seismic shot communication. The drill string may be rotated in a special on/off sequence or pumping of borehole fluid may be turned off and on in a predetermined sequence. These augmentary methods are very much poorer in signal bandwidth compared to seismic but can be useful for sending simple messages under high ambient noise and weak seismic signal conditions. The augmentary methods may be used separately or in combination with each other and with the seismic shots.

The subsurface sensors may include a small array of geophones, hydrophones or other motion or pressure sensors, and are both for the primary purpose of receiving seismic waves from the surface shots and for a secondary purpose: to determine periods of quiet when noise levels fall below a threshold level. The threshold level may be pre-set, communicated from the surface during the mission, or dynamically set according to a downhole process. The seismic receiver is programmed to know that shots will not be taken at the pre-determined times if drilling or pumping is underway. Thus power conservation and conservation of computer resources may be realized by not recording and by limiting the processing under high noise conditions. A further means of resource conservation may be implemented in which temperature and pressure sensors are also included in the VSP receiver tool and the VSP receiver may be programmed to not attempt to receive seismic data until pre-programmed temperature and pressure conditions are met.

The downhole processor may be linked to controllers of other while-drilling logging tools so that instructions and other information, conveyed via seismic shots or the augmentary signaling means to the downhole processor, may be relayed to them; and so that they may send information back to the downhole processor for its possible action.

Calculations of downhole clock drift may be made after the re-occupation of any previously-seismically-surveyed position in the borehole. These calculations may be made while the mission is in progress, for example by re-shooting selected receiver positions as the drill string is withdrawn from the hole for a bit change, or after the bit change as the drill string is extended downward through the prior-surveyed borehole. The drift calculations may be made in the downhole processor; or at the surface if seismic travel times have been transmitted uphole by mud pulse telemetry or other signaling means. Or they may be made after the seismic receiver has been returned to the surface and its information transferred to the surface seismic controller computer. The downhole clock may be re-synchronized to the uphole or master clock at the commencement, during the downhole mission and after its termination; the seismic travel time estimates may be corrected for drift of the downhole clock during the downhole mission and/or after the return of the VSP receiver to the surface. Selected information from the VSP survey processing performed downhole and other information is transmitted to the surface by use of mud pulse telemetry or other available uphole signaling means.

BRIEF DESCRIPTION OF THE DRAWINGS

Other features and advantages of the invention will be recognized and understood by those of skill in the art from reading the following description of the preferred embodiments and referring to the accompanying drawings wherein like reference characters designate like or similar elements throughout the several figures of the drawings.

FIGS. 14a and 14b illustrate TABLE 1 which depicts a project menu according to the preferred embodiment providing for communication with a VSP while-drilling tool, linked to other controllable tools, and utilizing binary seismic signals only.

FIGS. 15a, 15b and 15c illustrate TABLE 2 as an example of the application of the project menu from TABLE 1 to message transmission and reception.

FIGS. 16a and 16b illustrate TABLE 3 which depicts a similar project menu to that of TABLE 1, but adds utilization of time-shift signaling to augment the binary seismic signaling, so as to enable the efficient communication of numerical parameters such as current VSP tool position in the borehole.

FIGS. 17a, 17b and 17c illustrate TABLE 4 as an example of the application of the project menu from TABLE 3 to message transmission and reception.

FIGS. 18a and 18b illustrate TABLE 5 as a project menu according to the preferred embodiment providing for communication with a VSP while-drilling tool, linked to other controllable tools, and utilizing binary seismic signals together with activation and pausing of drill bit rotation to communicate to the tool.

FIGS. 19a, 19b and 19c illustrate TABLE 6 as an example of the application of the project menu from TABLE 5 to message transmission and reception.

DESCRIPTION OF THE PREFERRED EMBODIMENTS

Figure 1:
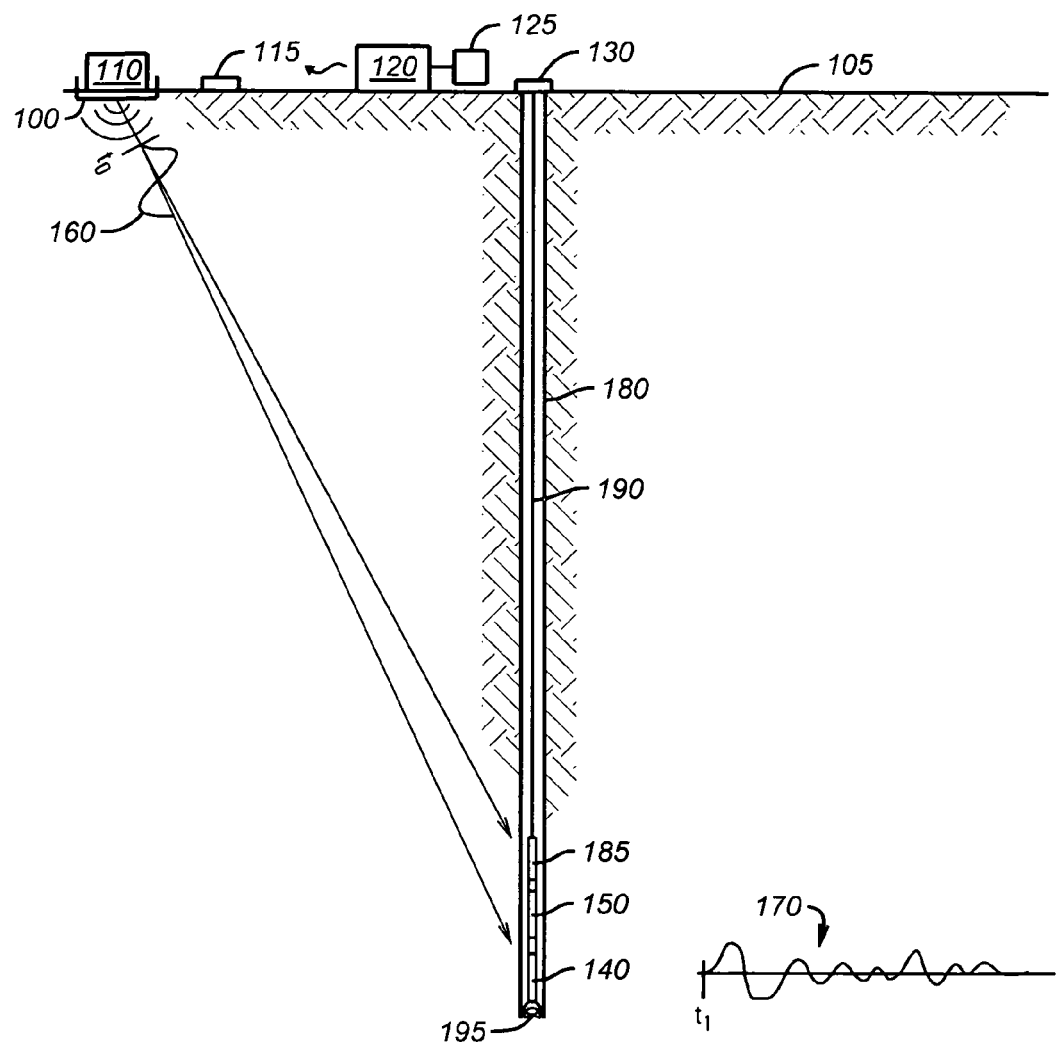
FIG. 1 is a schematic profile view of a rock formation showing a borehole, while drilling is in progress, depicting seismic and associated system elements.

Referring to FIG. 1, a borehole 180 contains a drilling string assembly 190 connected to a wellhead equipment ensemble 130. A controllable while-drilling VSP seismic receiver/processor tool 150 (called VSP receiver in this document) is located deep in the borehole 180 at the lower end of the drilling string assembly 190. At the or near the earth's surface 105, a repeatable seismic source system 110 (called seismic source hereafter) is located at a fixed site 100. Seismic source 110 generates seismic signals 160 in response to commands from a VSP system controller 120. Seismic-sensor system 115 monitors the seismic signals 160 and any seismic emanations from the vicinity of the borehole.

VSP system controller 120 provides an operable interface between the seismic source 110 and a surface operator. In the preferred embodiment, the VSP system controller accepts commands from the operator such as by a keyboard or data entry link. The VSP system controller then executes the commands according to pre-programmed instructions or menus, and transmits coded signals to the seismic signal source 110 over any appropriate communication link, causing it to activate periodically to produce a desired sequence of seismic shots (see definition of a seismic shot). VSP system controller 120 may be a stand alone assembly or may be in continual communication with another device or system, such as a well master system controller 125 that controls other equipment and subsystems of the wellhead equipment ensemble 130.

Seismic source 110 comprises one or more of any substantially repeatable vibratory or impulsive controllable seismic signal generators such as are commonly used in Vertical Seismic Profiling (VSP) applications in the petroleum industry. As such, the seismic source 110 is capable of generating a series of identical or substantially identical source signals 160. Suitable seismic frequencies are those less than about 500 Hz, but it is envisioned that frequencies on the order of 8-150 Hz will be most appropriate. A number of suitable seismic sources are available in the industry for the application. Modern Vibroseis sources are ideal for this application and are highly repeatable and controllable to within 250 microseconds. Other suitable sources may include impulsive sources such as the land or marine airgun systems.

Fixed site 100 is an area of limited size in which one or more repeatable seismic sources can be located while maintaining the operation of seismic shot synchronization/communication, as disclosed below. Multiple sources may be shot simultaneously to increase signal strength. The precise size of the fixed site may vary somewhat, but is constrained by the general requirement of quality assurance, and the differences created in the transmitted seismic signals by significant movement of the source location. A dynamically positioned seismic source with limited variation in location may be most suitable for marine applications, for example. Reasonable testing will provide a guide to appropriate dimensions for the outer boundaries of the fixed site.

More than one fixed site may be utilized in a given project associated with one borehole 180. This is required in the case of a 'walk-away' or 'walk-above' VSP survey. Multiple boreholes 180 may also be utilized to receive any seismic shots so generated, if each is equipped as shown in FIG. 1. The fixed site 100 and seismic source 110, instead of being at or near the earth's surface, may alternatively positioned in the borehole 180 or in a different borehole in the vicinity.

The seismic signals 160 generated by the seismic source 110 are monitored for quality assurance using one or more seismic sensor arrays 115 placed at or near the earth surface or in a borehole. It is envisioned that seismic sensor array 115 will be located on the order of a few hundred feet from the seismic source 110, although this distance is not crucial to the invention. Appropriate seismic sensors include geophones, hydrophones, and a combination of geophones and hydrophones. Seismic sensor array 115 preferably has a communication link to both the seismic source 110 and system controller 120. Recording of signals from seismic sensor array 115 and their analysis is accomplished by system controller 120. Appropriate communication links include radio, wire and fiber optic.

The nearly identical seismic signals 160 (from each shot of the series) each traverse the lithology around the wellbore in an identical manner to arrive at the VSP receiver 150 by myriad direct and indirect paths. By arrival time, each seismic signal has been naturally altered by noise, multiple reflection, attenuation, and other factors. Thus, upon arrival the seismic signal may have a longer signal profile as depicted by received seismic signal 170.

The VSP receiver 150 in the borehole 180 is controlled by pre-loaded instructions and by instructions conveyed to it via seismic signals 170 and/or via other signals generated by surface-controlled operation of the drilling and pumping processes of the drilling rig. The controllable while-drilling non-VSP tool 185 (called controllable tool in this document) is in physically proximity and in direct communication with the VSP receiver 150. This tool may be, for example, an acoustic logging (while-drilling) tool. It may, in different example, be a controllable tool that is not a logging tool. A controllable downhole while-drilling signal transmission device 140 (called a telemetry transmitter in this document) such as a mud-pulse signal generator is in direct communication with and is controlled by the VSP receiver 150. The afore-mentioned devices 150, 185 and 140 are configured as the lower part of the drilling string assembly 190. The drill bit assembly 195 is located at the deepest position of the drilling string assembly and creates new borehole as it is rotated. Rotation of the drill bit and pumping of borehole fluids is controlled by the surface operator. Pumping causes circulation of the borehole fluids, such as drilling mud, downward through the drilling string assembly and upward between this assembly and the borehole wall.

As explained below, a series of the nearly-identical seismic signals 160 are used to control and synchronize the VSP receiver 150. The VSP receiver receives all of the communications from the surface whether in the form of seismic signals of in the form of signals sent by manipulation of the drilling operations such as rotation of the bit or pumping of borehole fluid. It detects, records, processes and analyzes these signals. The analysis yields an interpreted message in the form of instructions or other information which the VSP receiver either acts upon to control its own processes or further transmits to other downhole controllable devices such as controllable tool 185 and telemetry transmitter 140. Any while-drilling downhole devices capable of performing a controllable action or series of actions that can provide a desired result are possible controllable devices in the preferred embodiment of this invention.

The received seismic signals 170 first serve the purpose of communication from the surface to the VSP receiver 150 as described herein, but also serve a second very important purpose, that of facilitating precise and accurate time-keeping in the VSP receiver 150, and this is crucial to success of the VSP survey itself. A clock in the VSP receiver may be periodically re-synchronized to a surface clock that controls timing of seismic shots and this allows correct determination of seismic travel times to within ½ millisecond or better. The method by which this is accomplished is explained in detail later in this description of the preferred embodiment.

A third purpose of the seismic signals 170 is to provide the basic seismic data that are the essence of the VSP survey itself. These seismic signals are recorded, processed and analyzed to provide the seismic images, seismic velocity model, derived geologic models and interpretations that are the primary objective of the VSP survey method. Because these important results are available in timely fashion during the drilling phase their value is increased many-fold over that of traditional post-drilling VSP surveys.

Figure 2:
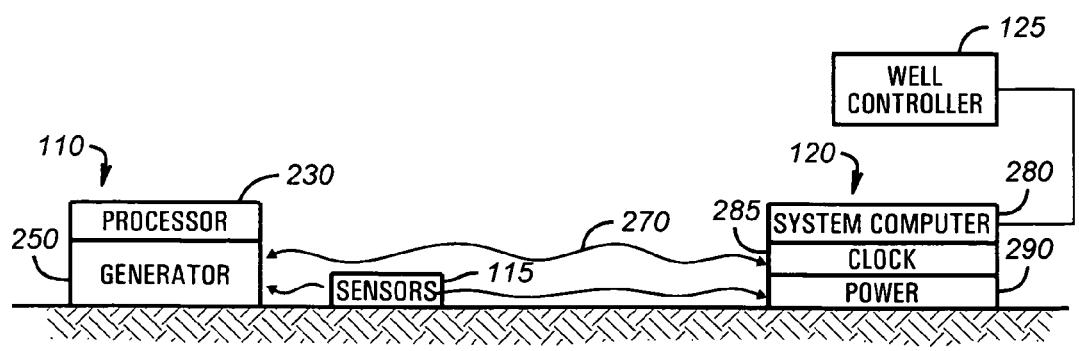
FIG. 2 is a view of the portion of the preferred embodiment at or near the earth's surface.

Referring now to FIG. 2, the repeatable seismic source system 110 includes a source control processor 230 and a seismic signal generator 250. VSP system controller 120 includes system controller computer 280, master clock 285, and system controller power supply 290. Communication link 270 extends between seismic source 110 and VSP system controller 120. Seismic sensor array 115 is also shown.

VSP system controller 120 accepts instructions from the human operator by, for example, a keyboard or mouse. Alternatively, a computer or other device may provide instructions to VSP system controller 120 directly. The system controller computer 280 translates these instructions into a coded command sequence according to a project plan as embodied in a series of pre-programmed project menus. Examples of the project menus are shown in Tables 1, 3 and 5.

The system controller computer 280 transmits to the seismic source system 110 a "fire" (i.e. initiate a seismic signal) or other command at a time determined by the master clock 285 and according to application of the pre-loaded project menus to translate the desired downward communication. Master clock 285 is preferably a highly accurate clock with stability of 1 part per billion or better. The system controller computer 280 uses the master clock 285 to set the times of its commands to the source control system such that the seismic shots are initiated at precise and accurate times as called for in the project menus and as expected by the downhole elements of the system. Power supply 290 provides power to the system.

Upon receiving a command from system controller 120, the source control computer 230 of the seismic source system 110 quickly checks the command signal for quality assurance by methods known to those of ordinary skill in the art. The source control processor 230 then triggers the seismic signal generator 250 to initiate a seismic signal 160 beginning at the required instant.

The system controller computer 280 also monitors the actual performance of the seismic source 110 by processing and analyzing the seismic signals detected by seismic monitor sensor array 115. For example, to establish the quality of the transmitted seismic signals 160 the system controller computer 280 may cross-correlate and compare a detected seismic signal corresponding to the repeatable seismic signals 160 to a stored rendition of the ideal seismic signal 160. Thus the system controller computer 280 is able to perform quality assurance of the seismic source system. The system controller computer 280 may also process and analyze other recorded seismic data from the seismic sensors system 115. This seismic data may be generated by, for example, the rotation of the drill bit assembly 195, by activation of geologic faults or by movement of reservoir fluids. In the case of auxiliary signaling to the VSP receiver by means of bit rotation or pumping in a pre-determined sequence, the seismic and other sensor data may be analyzed for correct signaling characteristics.

Figure 3:
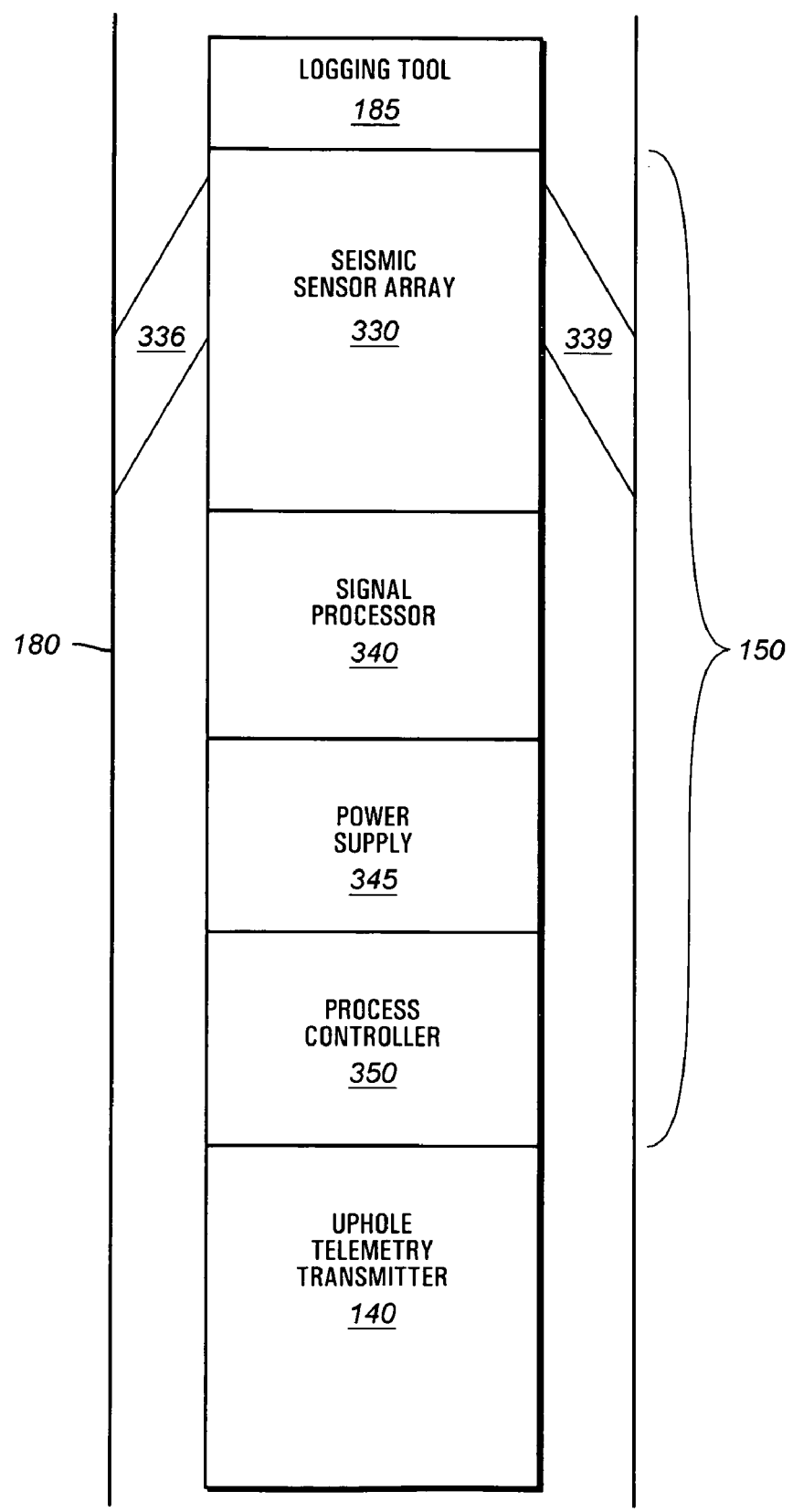
FIG. 3 is a view of the while-drilling VSP seismic receiver tool 150 positioned in proximity to the telemetry transmitter 140 deep in the borehole.
Figure 4:
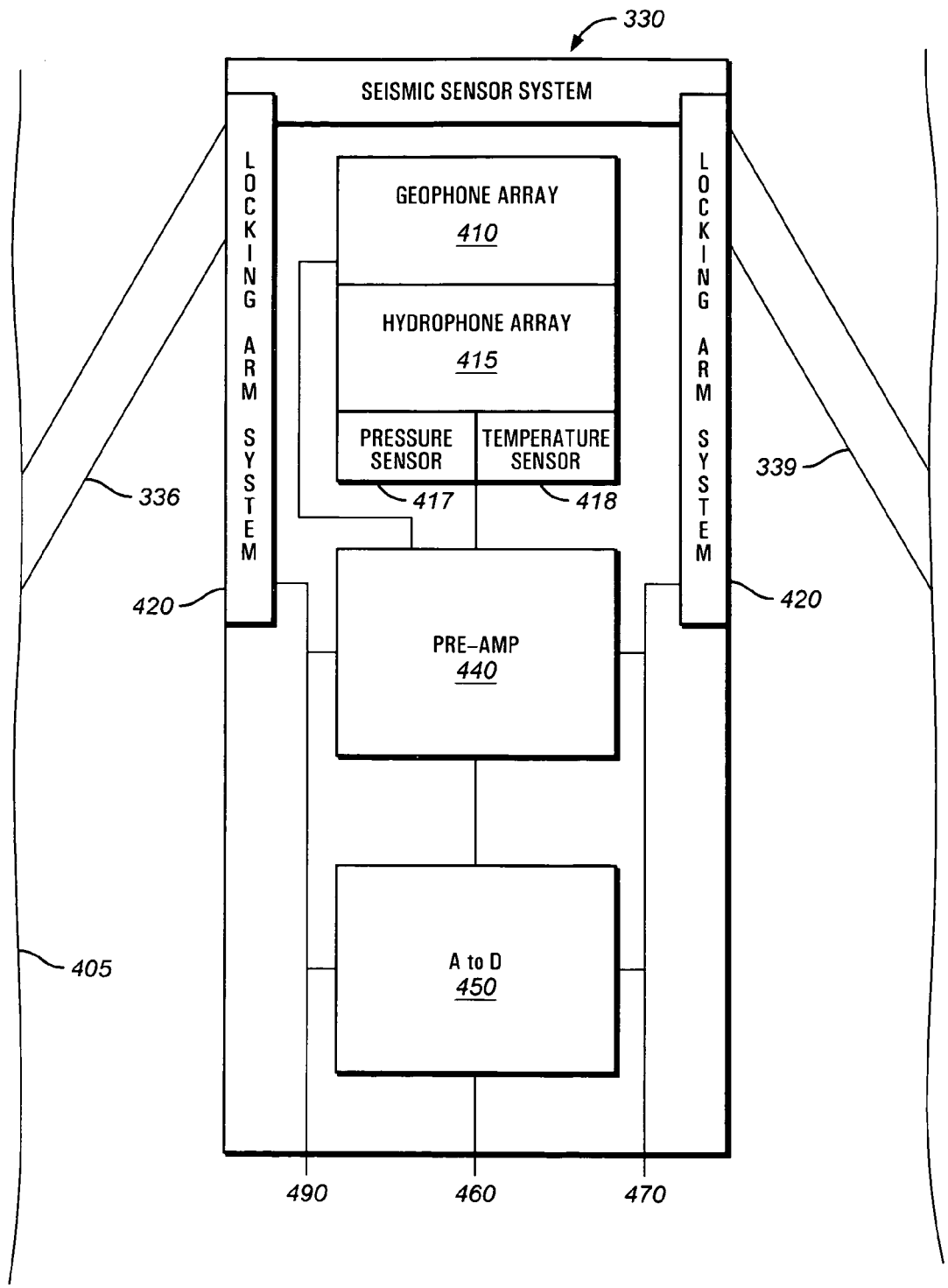
FIG. 4 is a schematic view of the seismic sensor system 330.

Referring to FIG. 3, the VSP receiver 150 includes a seismic sensor system 330, one or more optional locking arms 336, 339, a signal processor 340, a power supply 345, and a process controller 350. An optional controllable while-drilling non-VSP logging tool 185 and an optional telemetry transmitter 140 are coupled to the VSP receiver 150. Each device and component shown in FIG. 3 is constructed to withstand the pressure, temperature, vibration and other extreme physical conditions present in downhole while-drilling applications. Appropriate downhole housings, manufacturing techniques, and other adaptations necessary for a device to withstand downhole while-drilling conditions, and continue to be operable, are known in the art.

FIGS. 4-8 show the elements of FIG. 3 in greater detail. The seismic sensor system 330 of FIG. 4 includes one or more seismic sensors (preferably 3-component geophones and/or hydrophones) 410 connected to pre-amp 440. Pre-amp 440 also connects to various other sensors 415 which preferably include a borehole pressure sensor 417 and a borehole temperature sensor 418. Optional locking arms 336 and 339 are shown engaged against borehole wall 405. A locking arm actuator system 420 (also optional), pre-amplifier 440 and analog-to-digital converter 450, are provided power via power cable 470. These three elements are controlled via communication link 490. Data link 460 connects directly to A/D converter 450 and carries digital signals from the A/D converter to the signal processor 340.

Locking arm 336 and locking arm actuator 420 are not required but may be desirable to provide an improved physical coupling of the seismic receiver system to the surrounding rock and thus to provide an improved sensing of the seismic waves passing through the rock. However a malfunction of such a device could cause costly delays in the drilling operation and hence they have been omitted from prior-art designs of while-drilling VSP tools. A single locking arm 336 or multiple locking arms may be provided if an improved design can provide a highly reliable configuration.

Geophone array 410 and hydrophone array 415 are suitable for detecting seismic waves. Downhole geophone and hydrophone designs are available in the industry for VSP applications and these sensors may serve the purposes of this invention. Preferably the geophone array 410 will include 3-component geophones capable of sensing motion in horizontal as well as vertical directions. Hydrophones (which sense variations in surrounding fluid pressure) are not dependent on non-verticality of the local borehole (as geophones may be) and only require contact with the borehole fluids. Thus they may be relied upon to sense the seismic wavefield in nearly all expected conditions and are not limited by borehole orientation. A multiplicity of these geophone and hydrophone sensors may be necessary to overcome noise and provide clear reception of the signal from the seismic source system 110.

By including a three-component geophone, advantage may be taken of source-generated seismic waves with particle motion in any spatial orientation. This gives advantage over a single component geophone, which in many situations would not provide adequate response to transverse particle motion. By choosing a three-component geophone both pressure waves and shear waves emanating from the seismic source 110 may be detected, giving an improved probability of accurate communication or synchronization from the surface 105 to deep in the wellbore 180.

Pre-amp 440 filters and strengthens the signals from the geophone array 410, hydrophone array 415 and other sensors 417 and 418. Analog-to-digital converter 450 transforms the analog signals that are generated by the sensors into digital signals suitable for manipulation by signal processors and micro controllers.

Alternatively the geophone and hydrophone arrays, pre-amp and analog-to-digital converters may be replaced by MEMS devices that perform the same overall functions but require less physical space.

Communication link 490 connects the seismic sensor system 330 to the signal processor 340 and is used for transmission of commands and system information to and from the signal processor 340. Seismic data is passed to the signal processor 340 via the data link 460. Electrical power is provided to the seismic receiver from power supply 345 via power cable 470.

Figure 5:
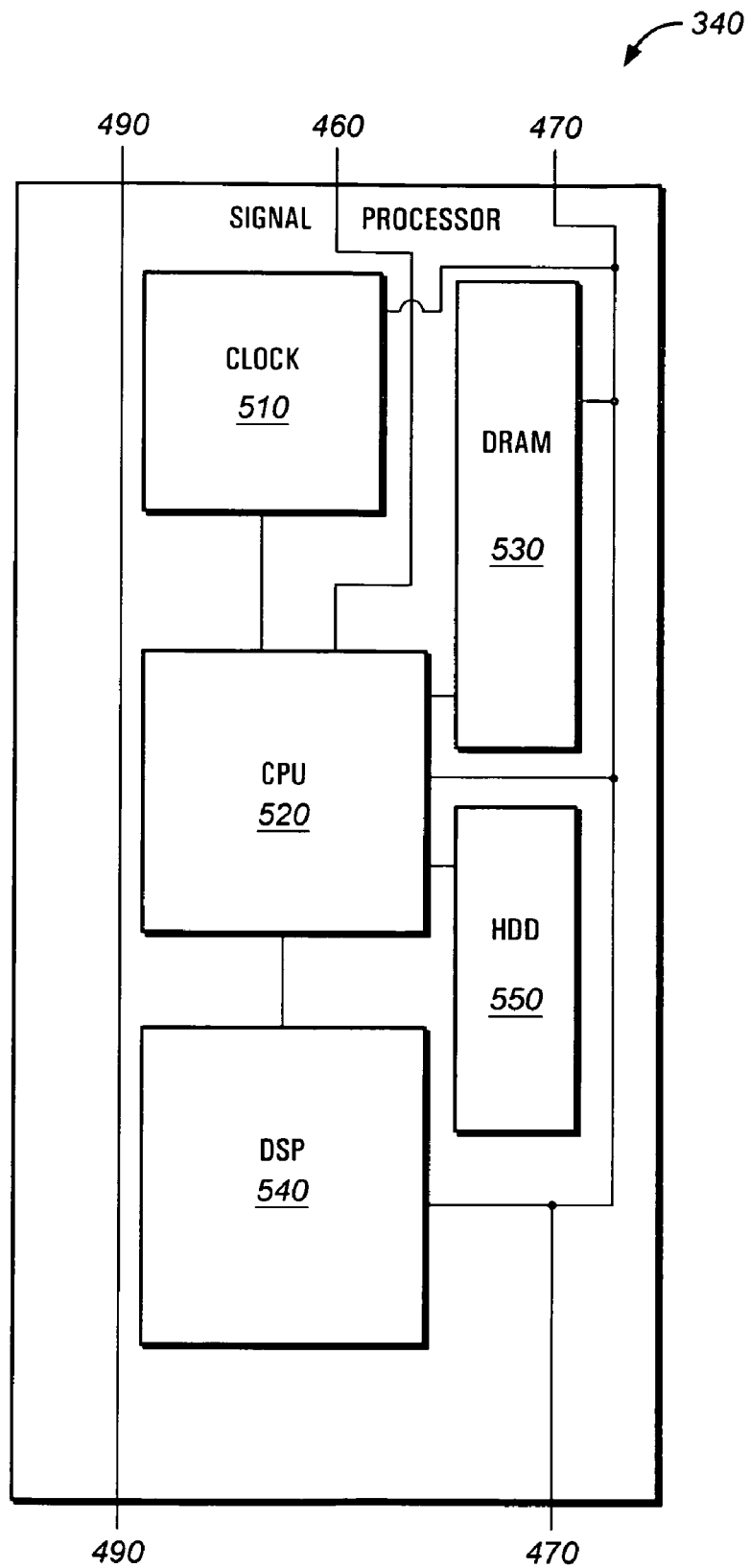
FIG. 5 is a schematic view of the signal processor 340.

Referring now to FIG. 5, a signal processor 340 is shown. Signal processor 340 connects to seismic sensor system 330 through data link 460, power cable 470, and communication link 490, and includes all necessary data storage and computing elements to provide for processing and analysis of the received seismic signals as well as essential project control information. Signal processor 340 therefore includes central processing unit (CPU) 520 (such as a microprocessor, microcomputer, or the like), an accurate (such as a $10^{-7}$ accuracy or better) digital clock 510, a digital signal processor (DSP) 540, a dynamic random access memory unit (DRAM) 530, and a fixed head disk memory unit or hard disk drive (HDD) 550. The downhole clock 510 provides timing signals to the process controller 350 and via the process controller to other associated controllable devices. The signal processor 340 may be alternatively configured without the HDD 550 if sufficient DRAM 530 or other memory can be provided to meet the computational and storage requirements. Also the functions of the CPU 520 and DSP 540 can be combined if there is sufficient capability available to serve the computational requirements on one device.

The CPU 520 performs a variety of functions. For example, the commencement (or cessation) of monitoring of drilling and pumping noise is controlled by the CPU 520 via communication link 490. The activation and commencement happens when a set of pre-programmed conditions have been met. One such condition, the borehole fluid pressure, as detected by the CPU 520's inspection of the output of borehole pressure sensor 417, will have exceeded a pre-programmed pressure indicative of a tool depth greater than the depth at which such a pressure level would exist. Likewise the borehole fluid temperature will have exceeded a pre-programmed temperature indicative that a sufficient depth has been reached to begin seismic shots. The signal output by the hydrophone array 415 is inspected frequently by the CPU after the above two conditions have been met so that it can assess the level of ambient seismic noise in the borehole fluid. The frequency of inspection is suitably about once every 3 seconds. Noise levels above a pre-programmed or dynamically chosen threshold level are indicative that active rotation of the drill bit assembly 195 is presently occurring. The threshold levels may be frequency dependent. If dynamically chosen, they are selected by the CPU 520 based on intelligence related to expected noise behavior during different drilling and drilling-related related activities normally encountered in an operation of the current type and in the current environment. The CPU is programmed to know that seismic shots will never occur during active drilling or pumping. A somewhat lower threshold level is set so that ambient noise caused by fluid flow during pumping operation will also mean that seismic shots will not presently be initiated. When the periodic inspection of ambient noise indicates that both drill and pump operation has ceased, the CPU 520 activates the seismic recording process. If locking arms are available they may be programmed to be activated immediately prior to the start of recording. Both the geophone and hydrophone array output signals are amplified, filtered and digitized and stored in the memory (DRAM 530).

Another parameter that may be used along with pressure, temperature and ambient noise levels is a minimum time prior to deployment, as determined by the downhole clock 510.

When monitored parameters indicative of depth subsequently show that the tool has departed the depth window for seismic recording, the seismic noise monitoring activities can be discontinued, as per programmed instructions of CPU 520.

Figure 6:
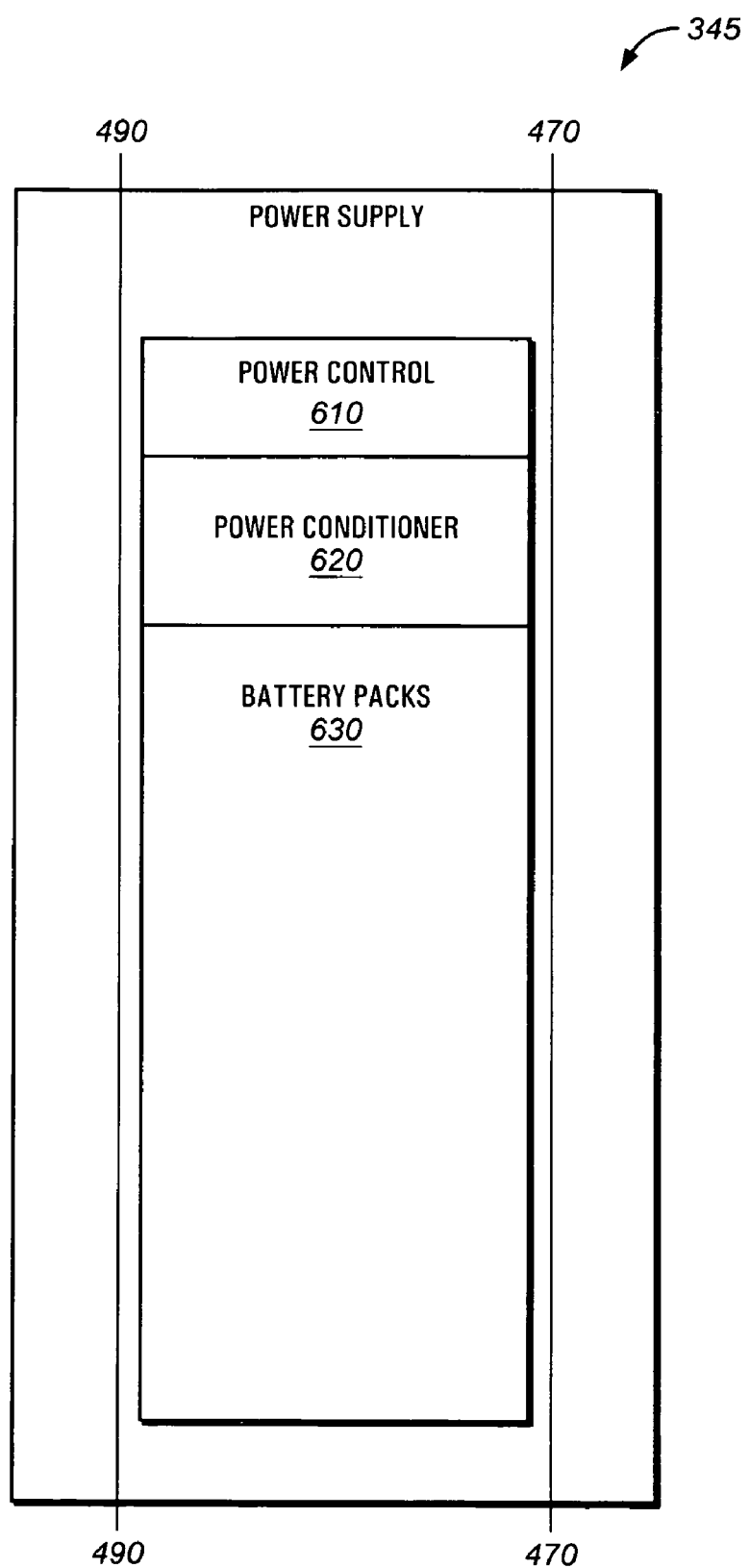
FIG. 6 is a schematic view of the power supply 345.

Referring now to FIG. 6, power supply 345 connects through power cable 470 and communication link 490 to the signal processor of FIG. 5. Included in power supply 345 are a battery pack 630, a power conditioner 620, and power control 610.

The power supply 345 must provide electrical power via power cable 470 to the seismic sensor system 330, the signal processor 340 and the process controller 350. Battery packs 630 and power conditioner 620 under the control of the power control system 610 provide the required power in the manner required by the served devices. Power conditioner 620 ensures that the electricity from the battery pack 630 has the desired parameters such as AC/DC, cycle, voltage, amperage, etc. Power control 610 switches the power supply to a "sleep" or low-power mode when and if desired.

Figure 7:
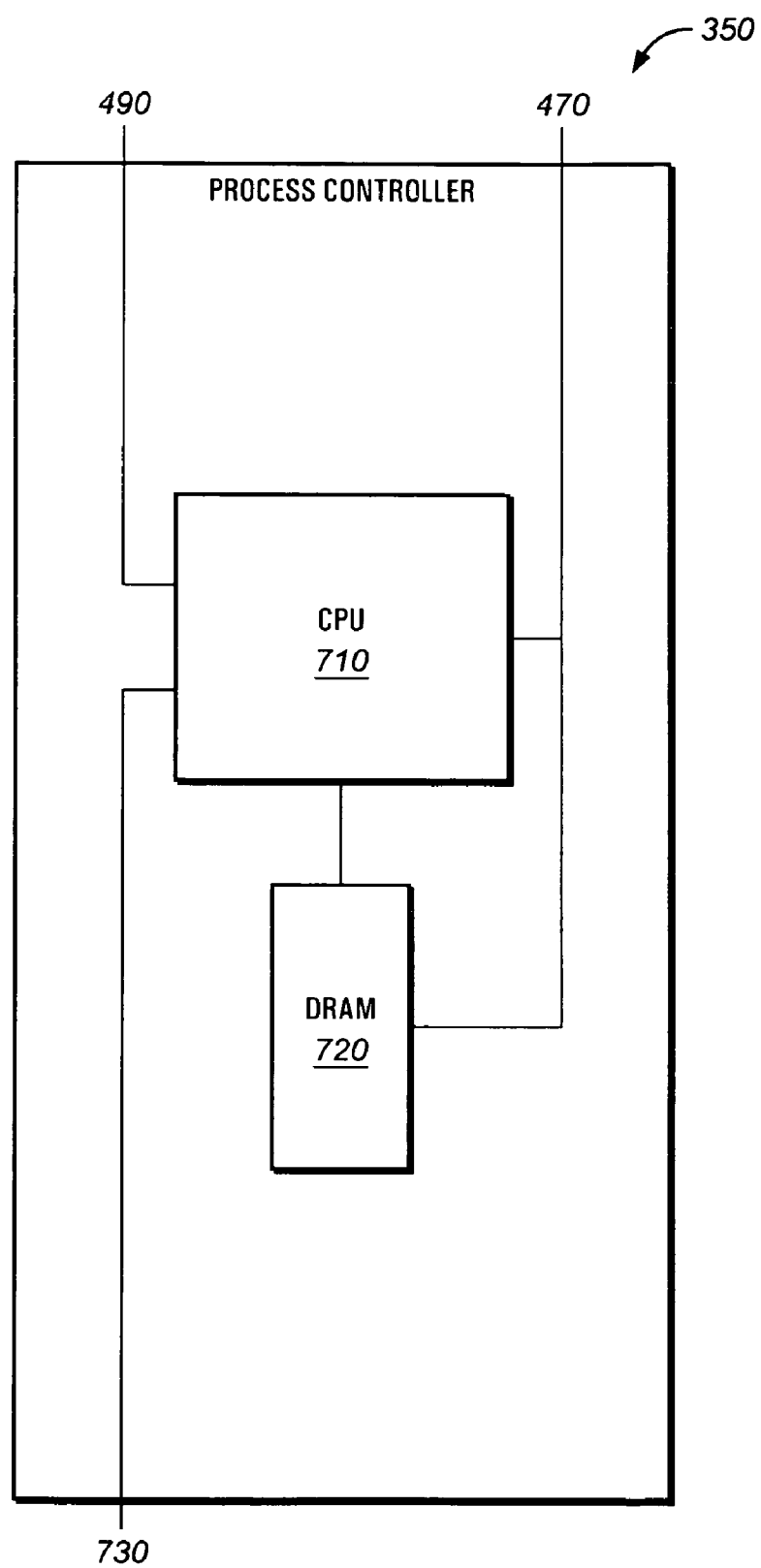
FIG. 7 is a schematic view of the process controller 350.

Turning to FIG. 7, the process controller 350 connects to the power supply 345 via communication link 490 and power cable 470. CPU 710 connects via communications link 490 with signal processor 340 and other active elements of the downhole system. CPU 710 also connects to DRAM 720, power cable 470 and command link 730. Command link 730 allows commands to be sent from the process controller 350 to the telemetry transmitter 140 and the controllable tool 185.

Figure 8:
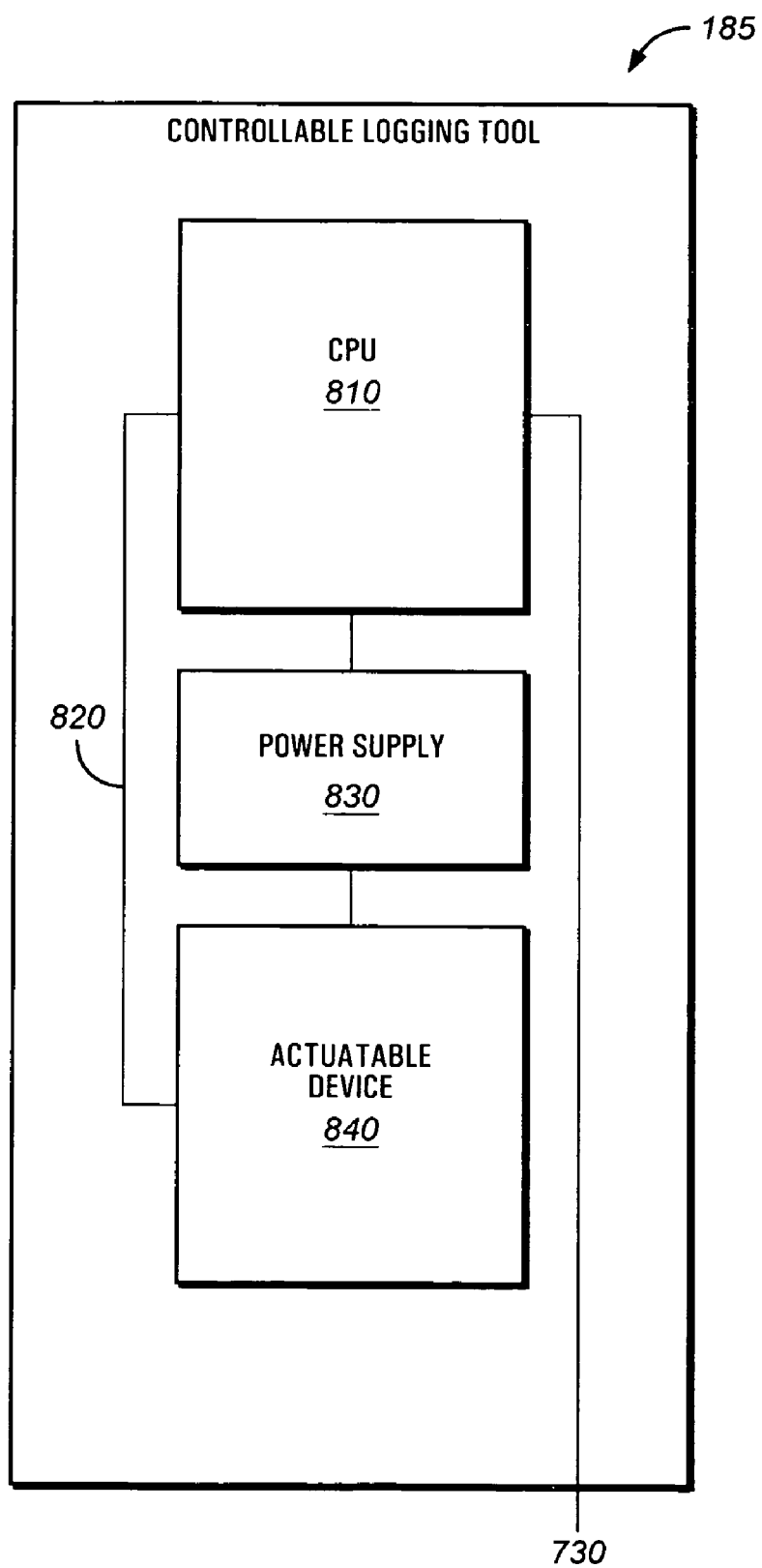
FIG. 8 is a schematic diagram of a controllable while-drilling non-VSP tool 185.

Referring now to FIG. 8, an exemplary controllable tool 185 is shown. The controllable tool 185 contains a central processing unit (CPU) 810, its own power supply 830, and an actuatable device 840. The actuatable device 840 responds to commands signaled by the CPU 810 via device actuator link 820. The controllable device may respond in any way the device is capable of performing. If it is an acoustic while-drilling logging tool, for example, it may be commanded to perform or to discontinue logging operation, to process its logs according to pre-programmed or newly conveyed (via previous seismic communication) instructions and to provide resultant data to the process controller 350 for further conveyance via the telemetry transmitter 140 to the well master system controller 125.

In view of the large variety of possible controllable devices, numerous changes are of course possible to the design of the controllable tool 185. For instance, the power supplies 340 and 830 may be combined in the design of the system if desired. CPU 810 may be eliminated if its functions are performed by another CPU or component in the system. Controllable tool 185 may also be modified for specific adaptation to the system disclosed herein, such as by altering connection terminals, the quality or number of communication links, etc. However, one advantage to the teachings herein is its ability to utilize controllable devices present in the prior art without extensive modification.

The telemetry transmitter 140 accepts commands from the process controller 350 which decides which data are to be transmitted and when it will be transmitted. The telemetry transmitter may be a mud pulse signal generator or any other suitable downhole-to-surface transmitter.

Enclosure of temperature-sensitive devices, especially including the downhole clock 510, within a vacuum or other heat-insulated container is a feature of the preferred embodiment for applications in extreme temperature conditions such as encountered in deep boreholes. It should be understood that the invention is not limited to the exact structure disclosed in FIGS. 4-8. Electrical and mechanical elements and sensors may be added to the system as desired, and many of the components of the preferred embodiment may be integrated with other components or eliminated if they are not required for a certain type of application. The computing (and data storage) functions of the signal processor 340, the process controller 350 and the controllable tool 185 or any combination thereof may be combined if so desired by providing one computer and programming it to perform all of the required functions. For example, CPU 710 and DRAM 720 may be one and the same as CPU 520 and DRAM 530. Conversely, redundant components may be provided to guard against system failure.

Figure 9:
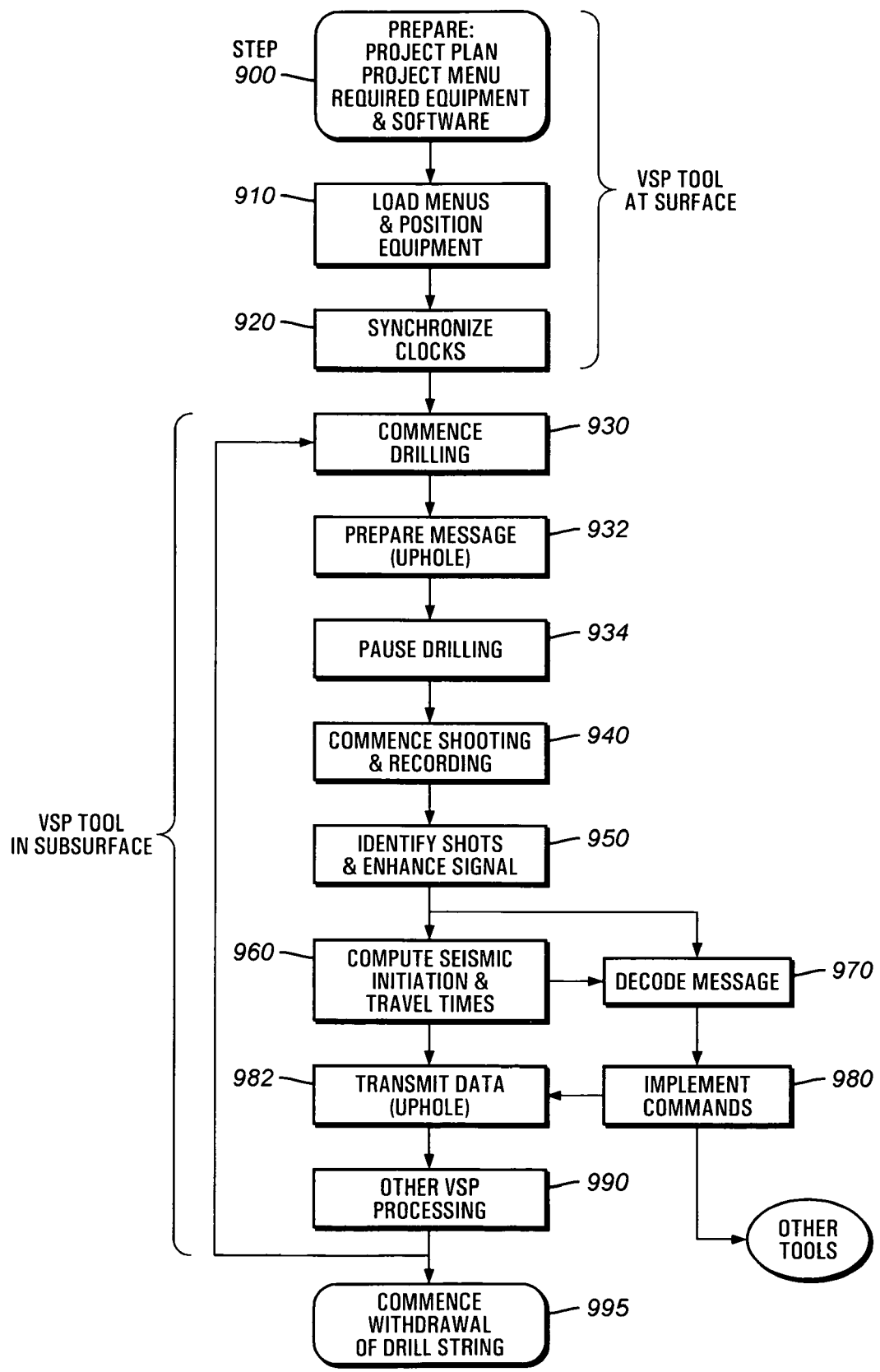
FIG. 9 is a process flowchart of a preferred method of while-drilling VSP, during the downward drilling phase, that results in the initial measurements of the seismic travel times and actuation of downhole controllable devices.
Figure 10:
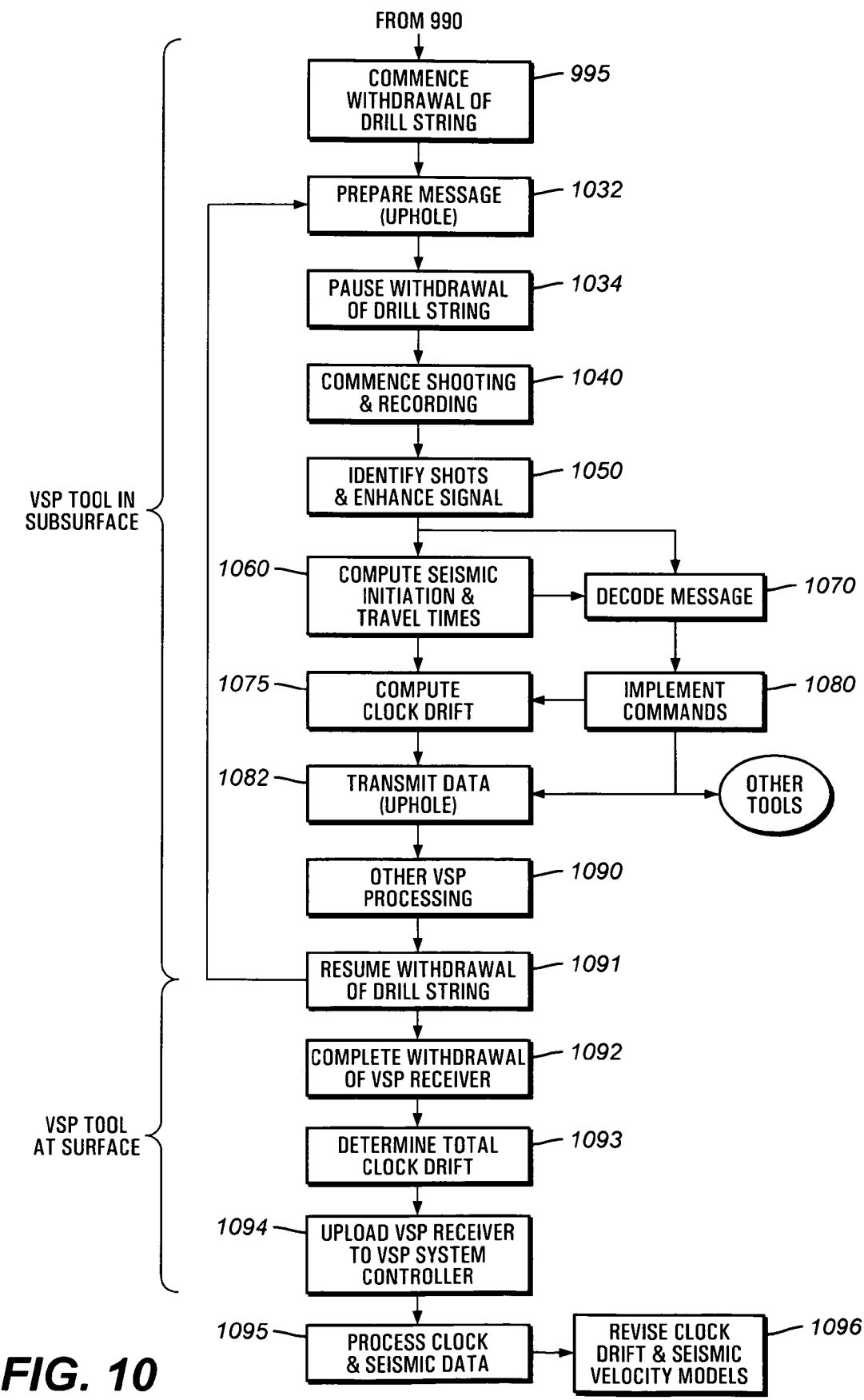
FIG. 10 is a process flowchart continuing after FIG. 9 that shows the preferred method of while-drilling VSP, during the re-occupation of a position previously seismically surveyed, that results in the subsequent measurements of the seismic travel times, estimation of downhole clock drift, and actuation of downhole controllable tools.
Figure 11:
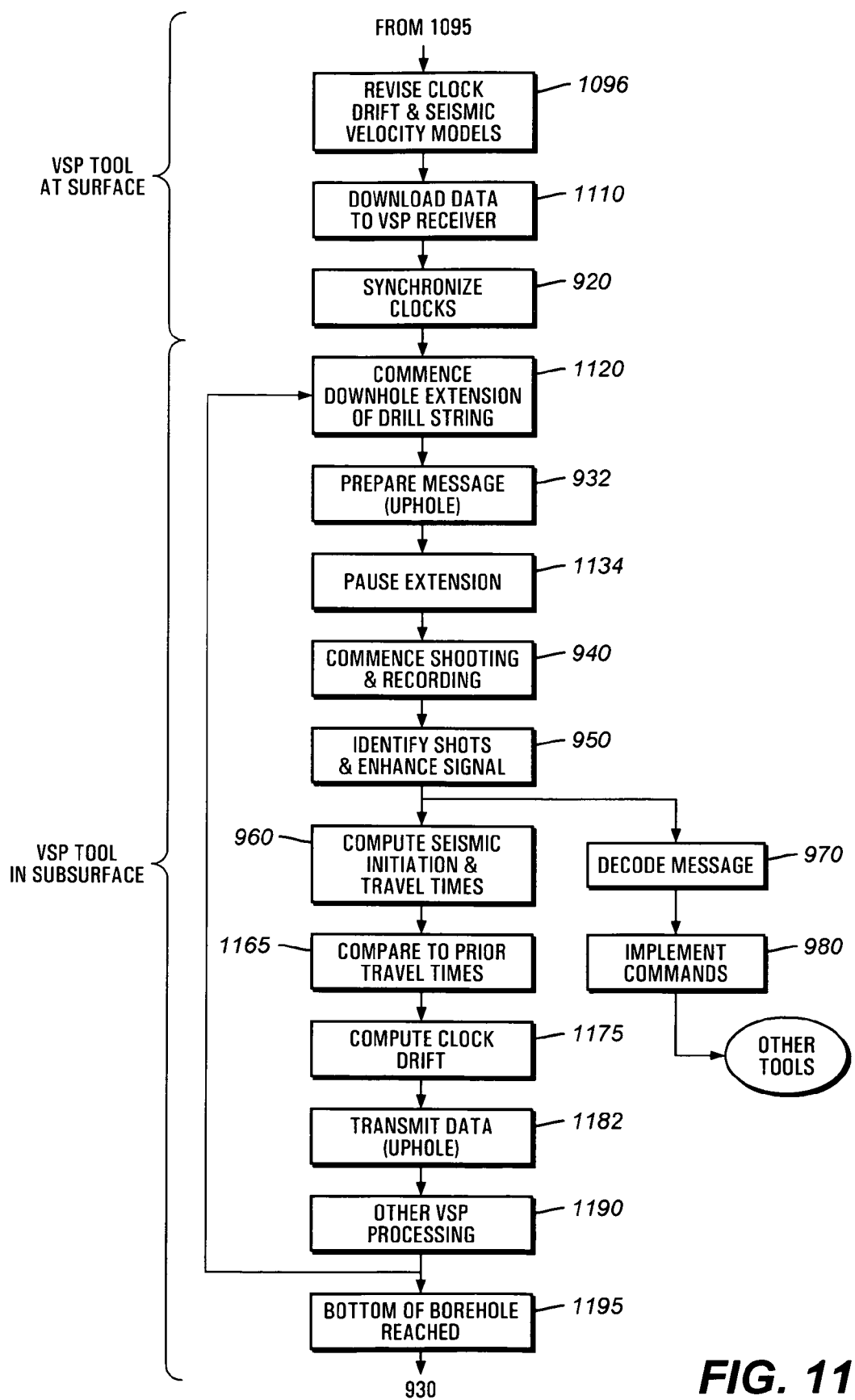
FIG. 11 is a process flow chart continuing after FIG. 10 showing the preferred method of while-drilling VSP, during the stage of extending the drilling string assembly downward through previously shot borehole and re-synchronizing the downhole clock prior to resumption of actual drilling.

The components of the system are preferably utilized according to the methods next described and illustrated in FIGS. 9-11. These methods share certain features with those disclosed in U.S. Pat. No. 6,002,640 and U.S. Pat. No. 6,584,406, both hereby incorporated by reference for all purposes.

FIG. 9 is a process flowchart depicting the major significant process steps that are conducted prior to and during the initial active drilling phase of a petroleum drilling project that utilizes the methods and systems of this invention for seismic communication from the surface to the while-drilling tools including the VSP receiver 150.

At step 900, off-site and other preliminary acts are taken to prepare for the VSP-while-drilling project. This includes the design and selection of project plans and project menus, as well the loading of menus into the appropriate CPU's, and other preparatory acts. Step 900 also includes selection of the configuration for the VSP receiver 150 and the repeatable seismic source system 110. Proper configuration ensures adequate signal-to-noise ratios for the received seismic signals. Reasonable prior testing and experience will provide a guide in this selection. The telemetry transmitter 140 and one or more controllable tools 185 are also selected and interfaced with the VSP receiver 150.

Figure 12:
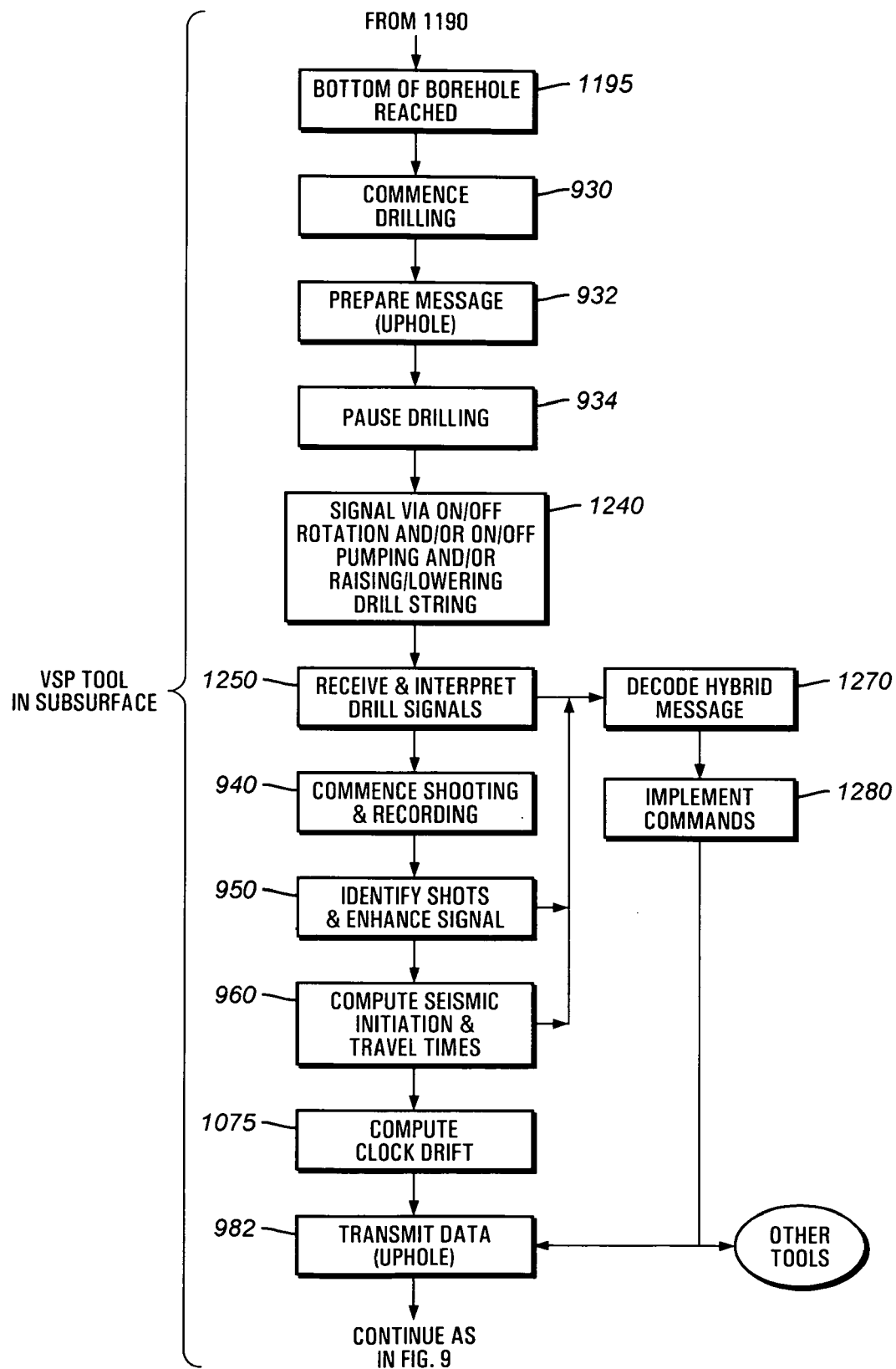
FIG. 12 is a process flow chart showing the process of hybrid communication combining seismic communication with communication by manipulation of the surface controllable drilling processes.

The project plan determines the list of possible commands from the surface to the VSP receiver 150 that are needed to control its own operation and also for it to relay to the other controllable devices for their control, as well as the specific sequence of seismic shots that indicate each particular command. If non-seismic-shot signals such as by surface manipulation of the drilling processes are to be utilized they are also included in the plan, however in the example of FIG. 9 only seismic communication is employed. (FIG. 12 provides an example that includes the non-seismic communications.) A Gantt chart may be prepared to enable an estimate of project duration and other aspects of the operation that will help determine battery power requirements of the downhole elements.

As part of the project plan development, project menus will also be designed. Examples of such menus are shown as TABLES 1, 3, and 5 of this document. These project menus are designed to be appropriate for the project requirements and devices to be controlled. The menu is invoked by generating a series of nearly identical seismic shots ("SISS") from the site 100 according to the timing protocol contained in the menu or by signaling via manipulation of surface-controllable drilling processes or by a combination of these two categories of communication methods.

At step 910, the surface and downhole elements are positioned near the well-head ready for commencement of active drilling operations. The project menus are loaded into the VSP system controller 120 and into the VSP receiver 150. All of the various programmable components of the uphole and downhole equipage are loaded with the appropriate programs and parameters chosen for the current project.

Just prior to commencement of drilling and while still at the surface, at step 920, the downhole clock 510 is synchronized with the master clock 285. Step 930 is the commencement of fluid circulation and rotary motion of the drill bit, i.e. active drilling begins.

While drilling continues the operator with the aid of controlling software decides what the content of the next communication to the VSP receiver 150 should be. The content may be in to form of commands or other information to be transmitted by signaling from the surface to the VSP receiver. This signal content is translated to times of shots, shot/no-shot binary signaling (including the number-of-shots form of binary signaling) and optionally into sequential manipulation of the drilling processes; all of this is done according to the communication protocols and codes contained in the project menu. All of the activity described in this paragraph is included in step 932.

At step 934 the operator pauses the drilling processes including rotation and pumping activities, either specifically to enable communication of for any other purpose such as adding a section of drill pipe to the string.

At step 940, when the pressure and temperature sensors have detected attainment of suitable pressure and temperature levels indicative of reaching at least to the programmed minimum depth in the borehole, and the seismic sensor system indicates sufficiently low ambient noise levels indicative of temporary cessation of rotary motion and fluid pumping, the seismic signal transmission/listening phase begins. During this phase, the downhole seismic sensor system 330 is placed into a "listen" mode by the CPU 520 to detect seismic signals. The "listen" mode entails activating the seismic sensor system 330 and recording seismic data into memory. The listen mode may either be a continuous period of listening or a series of listening periods separated by short pauses, based on the project plan and equipment capabilities. Also during step 940, the seismic source 110 is placed into a "signal generation" mode during which it is capable of transmitting on short notice a series of nearly identical seismic signals ("SISS") to communicate with components deep in the borehole and to provide seismic data for the VSP method. This SISS also includes periods during which no seismic shot is initiated as explained in more detail below. In addition, the SISS may be utilized to estimate the drift of the downhole clock 510, to enable re-synchronization of the downhole clock to the master clock 285, by determination of the amount of error that has built up after Step 920.

At step 950, the signal processor 340 processes and analyzes a sequence of recorded data for the current borehole location for the purpose of identifying valid shots and enhancing the signal-to-noise ratio of the seismic data. A best representation of the seismic signal (with maximized signal-to-noise-ratio) for the current location in the borehole is formed by combining identified shots additively or in a different preferred way. Quality indices are computed to rate the success of signal generation, reception and processing in terms of normalized cross-correlation peak amplitudes and times and conformance to other project menu requirements.

At step 960 this best representation of the seismic signal is processed and analyzed downhole to determine the seismic travel time of the first energy from the seismic shots, as is of paramount interest in the VSP method (knowing the shot initiation times from the project menu and the arrival times from the downhole clock). The seismic shot information is processed by the signal processor 340 with benefit of the best representation of the seismic signal to determine the times of initiation of each shot in the current SISS. The shot initiation times are constrained to a set of possible values according to the project menu. The seismic travel times are not known exactly beforehand and are one of the key items sought in the VSP method (being indicative of geologic and formation fluid parameters). Thus the VSP receiver, having determined the shot initiation times and the arrival times of the first energy from the shots, can readily compute the values for the seismic travel times. These individual computed times should each be in error only by the amount of uncorrected downhole clock drift and any error in the time determinations due to the influence of seismic noise.

At step 970 the shot initiation times determined in step 960 are then decoded by the process controller 350 using the project menu and converted to the language of the original message that was written uphole (in the form of commands and other information), and then transmitted to the appropriate linked device or retained for its own implementation.

If a command has been received for action by the process controller 350, during step 980 it executes the command itself. Other controllable devices (tools) receiving commands also take action accordingly in step 980. For example a controllable logging tool 185 may be commanded to activate using communicated parameters for a specified period of time and it responds accordingly.

In step 982, when the command specifies that data from controllable logging tool 185 is to be transmitted uphole, the command is then conveyed, together with the specified data, to the process controller, from the process controller 350 to the telemetry transmitter 140, which at the first opportunity transmits the data uphole. The process controller will similarly send its own acquired data, if so commanded, to the transmitter for its action.

At step 990 other processing may be conducted by the VSP receiver 150 to prepare the seismic images or related results from the survey for delivery to the VSP system controller 120. This delivery may occur after the receiver is returned to the surface.

The system then returns to step 930 and drilling re-commences or (step 995) the drilling string withdrawal from the borehole commences. The withdrawal may be necessitated by need for replacement of the drill bit assembly 195 if the drilling of the borehole has not been completed.

FIG. 10 continues after FIG. 9 and shows the steps that may be followed after the commencement of withdrawal of the drilling string assembly 190 from the borehole 180. In any case where re-occupation of a position in the borehole allows a second stage of acquisition of recordings of a series of seismic shots for that location, there exists the opportunity for computation of the drift of the downhole clock 510 that occurred between the two periods of data acquisition. In the case of no clock drift, the recorded data (in a noise free condition) would appear identical for the two stages or periods. In the case of drift of, e.g. 3 milliseconds during the intervening time, ideally the recorded data would appear identical except for a shift of 3 milliseconds. If the VSP receiver 150 knows that the two sequences of recording are for identical borehole positions, and has available the germane seismic data, it can compute the clock drift without awaiting a return to the surface. It may be necessary to seismically communicate the borehole positions for each of the two recording episodes for the VSP receiver to be able to link the two data sets, unless it can make this determination from pressure, temperature, comparison of the seismic data from the two times of shooting, or other data.

Referring to FIG. 10, at step 995, withdrawal of the drill string commences. At step 1032 the operator at the surface prepares the next message to be communicated to the VSP receiver 150. The CPU 520 continues to keep activated the downhole seismic sensor system 330. The sustained absence of sensor signals indicative of active drilling alerts process controller 350 to the possibility that removal of the drilling string from the borehole has commenced.

At step 1034 the drilling string assembly withdrawal from the borehole is halted temporarily for purpose of pipe section removal at the well-head or for any other purpose, for example to record seismic shots for VSP purposes at a geologic interface of interest.

During step 1040, when monitoring of the ambient noise level indicates that pipe motion and fluid flow have ceased, the CPU 520 is again placed in the "listen mode" as described in the preceding discussion of FIG. 9. Noise levels will be set lower during the withdrawal phase then in the drilling phase in order to detect these pauses because their is no actual drilling occurring between pauses. Fluid pumping, drill string rotation or drill string vibration can be initiated and paused in coordination with drilling string withdrawal to ensure the CPU 520 successfully detects the correct times for listening, i.e. recording seismic shots. A series of shots (the SISS) is launched by the seismic source 110.

At step 1050 the shot identification and signal enhancement activities of CPU 520 occur. Again, the seismic travel times are computed for the identified shots (step 1060) and the shot initiation times and shot/no-shot signals (including number of sequential shot signals) are decoded and translated into the received message (step 1070).

During step 1080 process controller 350 implements its received commands and linked logging tools implement commands directed to them.

The CPU 520 computes the clock drift in step 1075, if it has been made aware of the re-occupation of a prior surveyed position in the borehole and has access to the seismic data or processed seismic data from the prior activity.

The notification making it aware may have been provided in the just-conveyed message itself; alternatively the CPU 520 may be informed by the signal processor 340 that it has determined that a previously surveyed borehole position has been re-shot. Signal processor 340 could readily gain this knowledge by comparison of the received waveforms for the two periods of data acquisition for this same VSP receiver position, having been guided to a narrow range of potential positions by borehole temperature and pressure measurements.

Next, in step 1082, data from these calculations and any other data required uphole (and commanded to be sent) is transmitted by the telemetry transmitter 140 at the first available opportunity.

The CPU 520 conducts other VSP processing as it has been instructed and programmed to do in step 1090. Withdrawal of the drilling string assembly from the borehole is continued in step 1091 and either the above cycle is repeated for the next higher borehole location, or the withdrawal is completed (step 1092).

After its return to the surface, when the VSP receiver 150 is again connected to the VSP system controller 120, and this controller receives all of the clock information, including current time, the VSP system controller is able to compute the total downhole clock 510 drift that transpired during the subsurface episode just completed by simple comparison to the master clock 285 current time. This is included in step 1093.

All of the recorded data and processing results are uploaded from the VSP receiver 150 to the VSP system controller 120 during step 1094. The system controller is then able to commence processing of all clock data, all communication and all VSP data for any purpose including verification of results computed downhole, further signal enhancement, application of more elaborate methods, etc. The system controller also expeditiously computes the optimum revision of the seismic velocity model and clock drift curve for the prior downhole episode. If it can complete this task in time, the revised models are supplied to the VSP receiver before it begins its next downhole trip. Otherwise key information from these calculations may be transmitted to the receiver after it leaves the surface (by using seismic communication).

FIG. 11 is a process flow chart showing the preferred method of while-drilling VSP, during the stage of extending the drilling string assembly downward through previously shot borehole and re-synchronizing the downhole clock prior to resumption of actual drilling. The flowchart begins where the flowchart of FIG. 10 ends, with the revision of clock drift and seismic velocity models (step 1096) utilizing data acquired during the prior downhole episode. Next, in step 1110, the revised models are downloaded from the VSP system controller 120 to the VSP receiver 150. While still at the surface the downhole clock 510 is re-synchronized with the master clock 285 (step 920).

The downward extension of the drilling string assembly into the previously drilled and seismically-shot borehole commences in step 1120. At each location previously used for recording of seismic shots the VSP source may be activated to acquire additional seismic data for that borehole location. If the surface location of the seismic source 110 has not been changed (as might be deliberately done if a 'walkaway' VSP survey is being acquired) there is an opportunity to improve the quality of the VSP data for that position (by acquiring additional data and combining it with prior data for improvement of signal-to-noise ratio) and also to improve the estimation of the clock drift for both the prior and current shooting. In the simplest approach the prior data and clock drift estimate can be assumed to be correct and the clock drift for the current downhole run can be determined by direct comparison of the two seismic travel times. Applying this approach the VSP receiver can determine the clock drift that occurs during each stage and for the entire period of downward extension and when drilling begins at the bottom of the borehole there will be no accumulated drift error in the downhole clock. This is extremely advantageous in terms of the accuracy of seismic travel time measurements that are made as the borehole is extended further. The more elaborate approach of computing probable clock drift and velocity model errors can alternatively be used and also will attain significantly greater accuracy in determination of seismic travel times and clock drift in both the prior and current downhole runs.

The steps in FIG. 11 that are identical to the corresponding steps in FIGS. 9 and 10 retain the step numbers assigned in those figures. These recurring steps are not further explained in the following elucidation.

When, in step 1134, the downward extension of the drilling string is paused (for addition of another section of drill pipe or deliberately just for purposes of collecting seismic or other data) seismic shooting and recording may commence.

After computation of seismic initiation times and seismic travel times in step 960, the CPU 520 of the signal processor 340 compares the current data and results to prior seismic travel times (step 1165) and computes clock drift for the current run (step 1175). Key results from these calculations may be transmitted uphole in the following step 1182. Other VSP processing continues in step 1190.

The above sequence of steps repeats as the downward extension of the drilling string re-commences (step 1120). When the bottom of the borehole has been reached (step 1195), after the completion of the cycle of steps from step 932 through step 1190 for that location, drill bit rotation and pumping operations begin (step 930). Then the processes of FIG. 9 are again followed as new borehole is created. When withdrawal is resumed, FIG. 10 applies.

FIG. 12 is a process flowchart that shows an alternative to the seismic-only downward communication depicted in FIGS. 9, 10 and 11. The hybrid communication method combines seismic and other kinds of signals that can be conveyed to the VSP receiver 150 by special control of the drilling subsystems including the processes of on/off rotation of the drilling string assembly, on/off control of the drilling pumps and raising/lowering the drilling string assembly (possibly impacting the bit on the hole-bottom) and also inducing a characteristic vibration sequence into the drill string by an ancillary system. Alternatively, acoustic signaling in the borehole fluid column could be used if means are available. These processes are each controlled by the surface operator and each generates characteristic seismic (or acoustic) signal-normally considered to be noise to the VSP seismic data acquisition process. The processes are controllable but in such a manner as to make communication of information via their manipulation a cumbersome low band-width process. However they can be very useful in conveyance of simple messages in a high-noise environment and in that sense are more robust than signaling via seismic shots. When combined with seismic shots, these drilling signals can aid in extending the success of seismic signaling to higher-noise environments and reduce the number of seismic shots required to communicate a given message. Drilling signals can precede seismic signals, as called for by the project menu shown in Table 5, and may be used to alert the CPU 520 that seismic shots are to immediately follow at the programmed times. If no seismic-shot communication is available for whatever reason, simple commands conveyed by drilling signals alone can still be used to control the while-drilling logging tools (e.g. 185) and telemetry transmitter 140 coupled to the VSP-receiver 150.

In FIG. 12, the steps that are the same as in the prior FIG. 9 are numbered identically. After the pause in drilling at step 934, signal generation via on/off rotation of the drilling string assembly 190, signal generation by on/off activation of the borehole fluid pumping, signal generation by raising/lowering the drilling string, vibration of the drill string and/or acoustic signaling takes place, according to the project menu protocols. One, two or any number of these techniques may be employed in a pre-determined fashion.

The VSP receiver 150 detects the variations in its sensors' outputs that indicate the reception of the signals (mainly in terms of amplitudes and frequency characteristics of seismic energy as a function of time). The received drill signals are interpreted according to the project menu in step 1250. Any commands or other useful information that can be gleaned from the signals may be utilized at once. For example the message may be that a seismic communication will immediately follow with shots initiating at some of the pre-programmed times. (This is as in the example from TABLE 5).

In step 940 the SISS immediately commences after the drill signals. Steps 950 and 960 follow as in the example of FIG. 9. The shot/no-shot indicators and the computed seismic initiation times are conveyed to the hybrid message decoder which has already received the drilling process signals.

In step 1270 all of this information is decoded and translated into the hybrid message that the surface operator intended to convey. Any commands invoked by the message are implemented in step 1280. If they involve other controllable tools the relevant commands and information are further sent to those tools.

If called for by the message or the menu, data is then transmitted uphole in step 982. The sequence of processes then continues as in FIG. 9 but with the added steps in this FIG. 12 for each iteration.

Although the processes shown in flowcharts of FIGS. 10 and 11 have not been modified to add the hybrid communication processes, it can be appreciated that communication to the VSP receiver 150 using variation of the surface-controllable drilling operations (as in FIG. 12) can also be combined with the process steps shown in FIGS. 10 and 11. However, only those processes that do not require contact with the bottom of the borehole can be applied. Therefore in these applications the hybrid method is limited to using variation of pumping, rotation of the drill string without actually drilling, raising and lowering the drill string, inducing a characteristic vibration into the drill string at the surface, and/or acoustic signaling.

As indicated above, a series of nearly identical seismic shots ("SISS") and/or manipulation of surface-controllable drilling operations are used to communicate from the surface to a downhole device. A particular SISS is initiated only at start-of-programmed-time-window time (defined in the program menu) plus integral multiples of the parameter ZPTW (programmed time window interval), also contained in the menu. Within each SISS, shots may be initiated only at integral multiples of the unit time step. The unit time step is an important feature that enables the determination of downhole clock drift and exact shot initiation time in the presence of seismic noise. The unit time step is set at a sufficiently large value that clock drift plus noise influence will not cause an incorrect identification of the shot initiation time by the VSP receiver 150. Under good signal conditions a value of 20 milliseconds for the unit time step would be appropriate. Under poor signal conditions a value of 50 milliseconds would be advisable.

The programmed time window interval (ZPTW) may be set to a sufficiently small value that one interval almost immediately follows the previous interval in the while-drilling application of the signaling method. Furthermore, it may be set such that each time window immediately follows the prior window by the interval of time between the shots. In this way, the practitioner may schedule potential seismic shots at times separated by a constant time interval, from beginning to end of the downhole mission, if he does not desire to use the time-delay method of signaling (the time delay method is employed in the project menu of TABLE 3). Using a sufficiently small programmed time window interval guarantees there will be no significant delay required before commencement of shooting as any opportunity to acquire data becomes available. The project menu can be specified such that the first seismic shot of any sequence of shots defines the beginning time of the programmed time window. This approach makes best use of available time and reduces project costs accordingly. It also makes identification of shots a simpler mathematical process because of the periodicity of shots in any actual shooting sequence.

When it is desired to use the time-shift method of signaling it is best for shot-identification purposes to begin a sequence of shooting with a series of shoots equally spaced in time followed by the shots which may be time shifted to communicate information. This method is exemplified in the project menu shown in TABLE 3.

It can also be appreciated that each transmitted communication/command shot may be used to correct for clock drift as generally explained herein and in U.S. Pat. No. 6,002,640. Further to this, by creating a record of temperature history and a record of clock drift history, the two may be compared and used to aid in interpolation of clock drift between times of direct master clock re-synchronization and also between times of seismically-based drift computation; this technique is also useful in extrapolating clock drift variations when only temperature data is known.

Figure 13A:
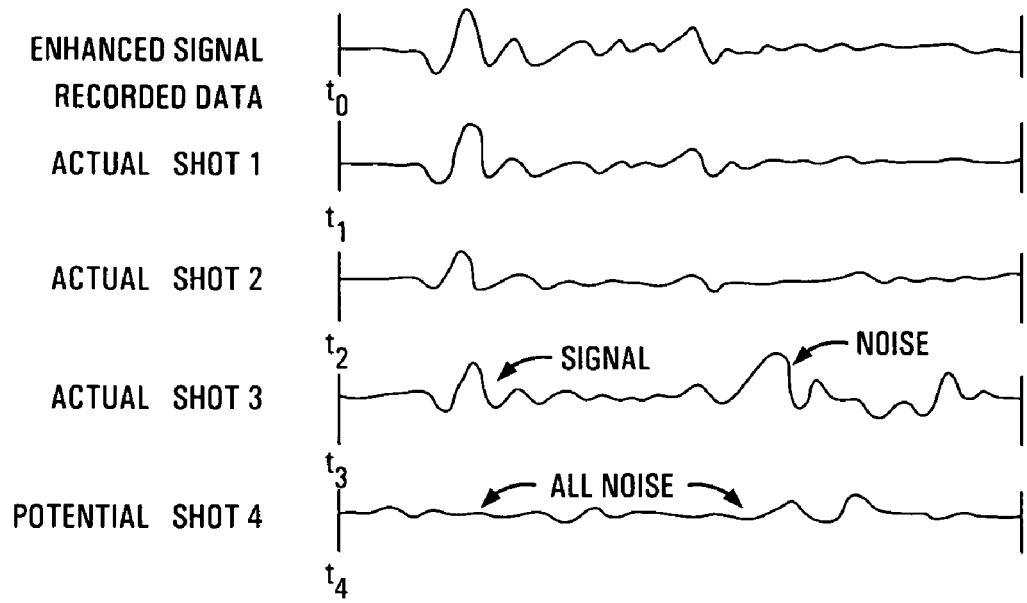
FIGS. 13a and 13b illustrate the comparison of received seismic waveforms using the enhanced seismic shot signal estimate and the cross-correlation process.
Figure 13B:
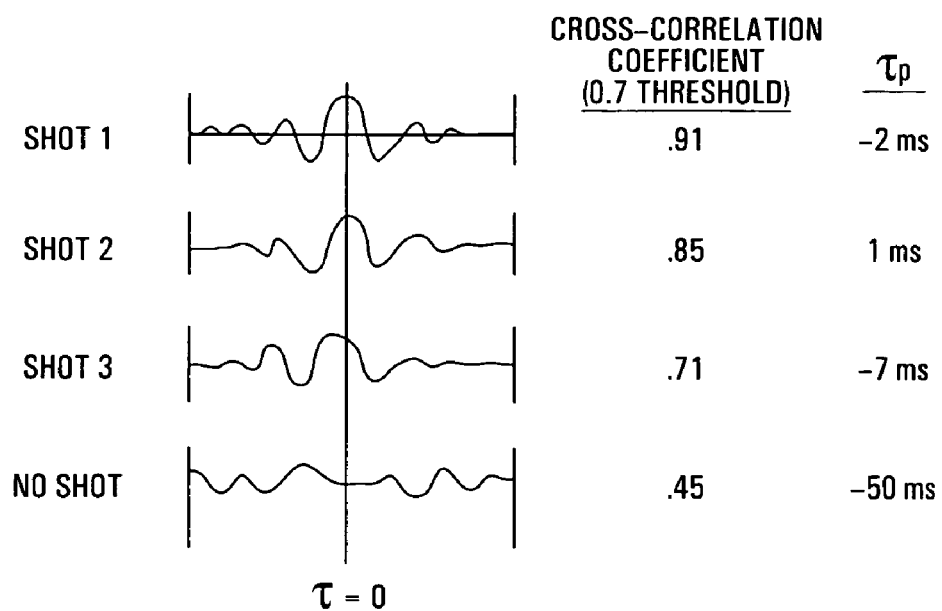

Referring to FIGS. 13a and 13b, a technique of cross correlation includes comparing two recorded seismic shots and deriving a degree of fit between them. If a high degree of fit is present, both recorded seismic shots can be reliably considered to have been detected. The time of arrival can also be reliably measured for each shot of the SISS. In this document the term cross-correlations refer to normalized cross-correlations that are formed by computing the zero-lag amplitudes of the auto-correlations of the two time functions being compared and dividing the cross-correlation amplitudes by the square root of the product of these two zero-lag amplitudes. If the two input time functions are identical the peak value, i.e. zero-lag amplitude of the normalized cross-correlation will have a value of unity. Noise present in the two amplitude-versus-time functions being correlated will result in a lower value of the peak amplitude and probably a time shift away from the zero-lag position. The amplitude of the peak value and time shift can be used as measures of the signal-to-noise ratio of the two input functions.

A threshold value of the amplitude or "correlation coefficient" can be set or established that, if exceeded by the peak amplitude of the normalized cross-correlation, indicates that a communication/command shot was received. The threshold value can be adaptively set based on observed signal-to-noise ratios, or may be preset at the surface prior to deployment downhole. An example of a pre-set correlation coefficient threshold is a value of 0.70. If this value is exceeded it is extremely likely that a shot was in fact initiated.

FIGS. 13a and 13b illustrate the application of the cross-correlation method to determine presence or absence of a shot initiated at the pre-programmed time. Although the cross-correlation method is depicted here, numerous processing techniques are known in the field of signal processing to determine whether a signal has been received and each of these is available to one of ordinary skill for this invention. In FIG. 13A, there is shown first an enhanced seismic shot signal estimate; this estimate may be formed from any number of shots recorded for the current VSP receiver 150 borehole location by mathematical combination of the available data to provide an optimized representation of the seismic signal. This signal estimate amplitude series is cross-correlated with data recorded in four sequential time windows in which there may have been seismic shots initiated according to the relevant project menu. In the example shown three of the four cross-correlations have positive peak amplitudes which exceed the threshold value which was set for the identification of a shot (0.70). (The correlation amplitudes have been normalized as described above such that the cross-correlation of identical input amplitude series would exhibit a peak coefficient value of unity.) The fourth correlation does not have any amplitude which exceeds the threshold and therefore it is deemed that no shot occurred. In practice a correlation coefficient threshold of 0.70 would ensure a high likelihood that "no-shot" instances would not be improperly identified as shots. In this manner correlation coefficients can be used for each potential shot being evaluated for presence/absence of an actual shot and used to appraise the quality of the results. Other similar quality criteria thresholds such as the scatter of peak amplitude times can be established to aid in the decision making regarding actions to take as a result of the seismic communication.

In FIG. 13a, SHOT 3 as recorded contains noise following the signal which is much higher than on SHOTS 1 and 2. The amplitude series labeled SHOT 4 was at the time of a potential shot, according to the project menu, but in fact no shot occurred. Thus this recording contains only ambient noise.

In FIG. 13b the cross-correlations of SHOTS 1 and 2 yield nearly symmetrical functions (with peaks very near to time zero) with high peak correlation values of 0.91 and 0.85, indicating excellent signal-to-noise ratios in the recorded data. The cross-correlation for noisy SHOT 3 has a peak correlation value of 0.71 (barely acceptable) and it is displaced by 7 milliseconds. However this does meet the criterion set for identification of a shot (>0.70). The recording for potential SHOT 4 when cross-correlated does not exhibit symmetry about time zero and yields a peak cross-correlation of 0.45, well below the required level of 0.70. Therefore it is concluded that no shot occurred. This sequence of three identified shots and one confirmed no-shot could be translated to a binary sequence 1110 according to one method of the preferred embodiment (for example, as implemented by the project menu in TABLE 1).

The time shifts measured for the valid shots in this example (−2, +1 and −7) or the cross-correlation functions themselves can be combined to provide an estimate of the drift of downhole clock 510 between the time representative of the recording of the reference function (the enhanced seismic shot/signal estimate as labeled in FIG. 13a) and the time of recording of these shots. Simple numerical averaging of the three time shifts gives a value of −2.67 milliseconds. A weighted average that accounts for the poorer quality of the SHOT 3 data yields a value of −1.5 milliseconds. Other methods such as combining cross-correlations additively or combining recorded data before correlation with the reference function may yield an even more accurate estimate of the drift and thus reduce the influence of noise. Thus the example data in FIGS. 13a and 13b can serve the purposes of communication as well as of re-synchronization of the downhole clock. And of course the same seismic data as in FIG. 13a can be processed for VSP purposes.

The method of FIGS. 13a and 13b assume a near-exact repetition from the same site 100 of the seismic source wavelet 160. If this can be achieved, variation in the resultant cross-correlations from a correlation coefficient of unity may then be ascribed to noise (ambient plus system noise). Thus, significant unintended variation in the seismic source wavelet or significant movement of the seismic sources may compromise the integrity of the communication.

Where SISS shots are used to communicate commands or information to the downhole components, the values corresponding to one or a series of command/communication shots are translated into commands and information according to a set of Menus programmed in the relevant CPU's (both surface and downhole), such as shown in TABLES 1-6. Each menu comprises a table of potential shot time values and/or shot/no-shot selection versus message information enabling the CPU to translate delays between seismic shots and the presence/absence of shots into usable information. For a particular CPU, a general menu is established which defines the most general case for the capabilities of that CPU or controllable device. Each general menu is composed of many variables, including a unique identifier. Standard defaults may be provided for certain variables. If there is not a general default for a variable, it may be determined solely by the SISS, and thus the general menu can be used directly (as can any menu).

For a given project, a single project menu is defined which includes all of the parameters of the applicable general menu and adds all of the project-specific parameters that apply. The project menu also establishes any variable that will not vary throughout the project or production schedule by means of setting default values. The project menu further defines project ranges and valid values for other variables. Some parameters are not explicitly stored in the menus, but rather are algorithmically computed from the shot interval times and/or number of shots in the SISS.

The SISS can be used to enable a more specific menu and thereby set additional default values. The SISS can also be used to enable a more general menu. In addition, the SISS can instruct a portion only of the process controller 140 to sleep or ignore subsequent commands, or to change menus, for example.

Examples of project menus are shown in TABLES 1, 3 and 5. An example of application of the project menu from TABLE 1 is shown in TABLE 2. Examples of the application of project menu of TABLES 3 and 5 are shown in TABLES 4 and 6.

Each menu includes parameters which are held constant for the particular project and variable parameters. The variable parameters may include control settings for any elements of the downhole system such as the seismic receiver, the power supply or for the actuatable device. The actuation commands for the actuatable device are the second class of variable parameters and as such are of primary importance.

Looking in detail at TABLE 1, a project menu is shown according to the preferred embodiment with provision for seismic communication from a fixed surface site to a while drilling VSP tool, linked to other controllable tools. In this project menu only binary seismic signaling is used. The parameters that are constant for the duration of the project are shown in the top half of the menu. The parameters that can be varied and their controlling seismic shots are shown in the lower half of the table. After the project name, the unit time step, UTS, is specified to be 20 milliseconds. The Listen Time is 6 seconds meaning that seismic data will be recorded for at least 6 seconds beginning at each time of potential initiation of a shot. The Buffer Time is 4 seconds. Together these two parameters add to 10 seconds which means that potential shots can be initiated at integer multiples of 10 seconds. The Programmed Time Window (PTW) intervals are set to CONTINUOUS meaning they can begin at any integer multiple of 10 seconds if a first shot is initiated at that time and NOISE has been less then the specified 10 microbars for at least 10 seconds. Other parameters are also assigned values in this section of the project menu and remain fixed for the duration of the project.

In the lower portion of TABLE 1, the project Variable Communicated Parameters are set forth. In this part of the project menu the seismic shots are shown in sequential order. The first ten shots (N1 through N10) will occur with 10 second intervals between shots, i.e. at integer multiples of 10 seconds. No parameters are conveyed by these shots. Following the tenth shot, there may be from one to nine additional shots (M1 through M9). Each of these is a potential shot which if actually initiated signifies a binary value of '1' and if not initiated signifies a binary value of '0'. Shot M1 is used to control the transmission of the seismic travel time for the current receiver position uphole. A value of '1' means to transmit the seismic travel time value. Shot M2 controls the transmission of a quality index. Shot M3 controls the transmission of the calculated downhole clock drift for the current shooting sequence. Shot M4 dictates the transmission or not of the current estimate of the velocity model error for the current receiver position. Shot M5, if initiated, calls for transmission of the current battery status. Shot M6 is used to activate or deactivate a linked tool, in this case a sonic while-drilling tool. Shot M7 controls the transmission of data from this tool. Similar usages are prescribed in the project menu for shots M8 and M9 for another linked while-drilling tool.

The complete shooting and recording sequence for this project menu consumes up to 190 seconds. This is less than the time normally consumed during the addition or removal of a drill pipe section as the drilling string is lengthened or shortened. The guaranteed minimum number of seismic shots, ten, ensures ample redundancy to facilitate the formation of a sufficiently good signal model by summation of data or more elaborate methods. Data may be summed before any shots is identified with a good likelihood that all or most of the ten shots will be included in the summation. Because there are no deliberate time shifts among the shots in this menu the signal will be summed exactly in phase. When a good signal model has been formed in this way, cross-correlations can be formed as an aid in detection of the potential shots M1 through M9. When detected, these shots can be combined with prior detected shots to build an improved model, and the process can be iterated for further incremental improvement in the model as more shots are identified. This would be especially useful in the case that the beginning of the shooting sequence had been assumed wrongly in the first pass.

An alternative approach to shot identification is to first use a final signal model for a nearby VSP receiver position and apply it to the seismic data from the current position. If the adjacent position is sufficiently close to the current position it's seismic signal will have a high degree of similarity to the signal for the current position, albeit time shifted by a small amount. After shots are identified for the current position they can be combined to provide the best model for the current position. Normally if the receiver positions are within 400 feet, e.g., this approach could make shot identification easier and more reliable in where noise conditions are challenging. Signal models from adjacent positions can also be compared by cross-correlation to determine the amount of seismic travel time difference between them, as a means of confirmation of travel time measurements made directly for each position.

In TABLE 2, an example of the implementation of the project menu of TABLE 1 is shown. The operator at the surface decides to send the message that calls for all of the possible actions except for the last two (he does not wish to activate WD Tool 3 and doesn't want to send any WD Tool 3 data uphole). Therefore he activates the seismic controller computer 280 and asks it to send at the first quiet interval (when drilling or lifting of the drilling string assembly 190 ceases for at least 10 seconds) the SISS that conveys this message. The appropriate SISS will have shots N1 through N10 followed by shots M1 through M7. Potential shots M8 and M9 will not occur.

The VSP receiver 150 records the seismic data during the correct time window as quiet conditions have pertained for at least 10 seconds. It sums or otherwise combines data from the recorded times when potential shots could have been initiated and their data received to form a signal model. This is cross-correlated with the individual contributing potential shot windows to identify actual shots. This process continues through a series of iterations that improves the identification of the shots and increases the quality of cross-correlations that are calculated. A column entitled 'Observed Corr. Coeff.' lists the best results. If the value is greater than the programmed value of 0.7 a shot is deemed to have been identified. In this example all of the shots have been correctly identified and a binary '1' or '0' assigned accordingly. Elimination of the contribution from the potential shots that were not actually fired results in an Average Corr. Coeff. of 0.84, an indicator of the quality of the results. 'Observed Raw Times' are listed for the identified shots—these are the times of the cross-correlation peak amplitude values added to the appropriate 'Corresponding Shot Times' in the menu. These values represent the computed shot initiation times for the shots. The 'Delta-to-Model Times' are the values by which the correlation peak times differ from the shot initiation times. Ideally they are all zero. The presence of seismic noise and downhole clock drift cause them to be non-zero. They can be averaged or otherwise combined to give a best-estimate of the downhole clock drift, which in the example shown is 1.0 milliseconds fast. Delta-to-model times can then be recalculated taking out clock drift to give times that are non-zero only due to the effect of noise. In this example the standard deviation of these residual time errors is 1.2 milliseconds. This quantity is used as a quality index for the overall process and is indicative of how much reliance should be placed on the seismic travel times that have been determined, as well as on the clock drift.

TABLE 3 contains a project menu that like TABLE 1 utilizes binary seismic shots following a series of shots but, unlike the prior example, also has a final sequence of shots that utilizes time-shift signaling. Shots N1 through N10 are always initiated first in the sequence, followed by shots M1 through M4 that use the binary protocol as in the prior example to control telemetry of data from the downhole transmitter to the surface. Following these shots, time-shift signaling is used for shots M5 through M9. Shot M5 may be initiated at any time from 140 to 144 seconds in steps of 20 milliseconds. The particular time chosen communicates the current VSP receiver 150 position in the borehole in terms of number of drill pipe section lengths. The current seismic source offset in the horizontal direction from the VSP tool is communicated by shot M6. This shot will range from 154 to 154.5 seconds initiation time, again in integral multiples of the unit time step of 20 milliseconds. The shot M7 conveys the latest uphole estimate of the downhole clock drift (made with benefit of telemetered seismic travel times and other information available uphole). Shot M8 indicates the number of shots in this shooting sequence and shot M9 indicates the number of shots in the next planned sequence. These values will be of benefit in the process of shot identification downhole. Numerical parameters with a range of potential values are thus communicated using the time shift method of seismic communication while parameters having a simple binary expression are conveniently communicated by using the binary method. The binary method in one of its adaptations can be used as a means of signaling by using a variable number of sequential shots, of course.

TABLE 4 provides an illustration of the utilization via an exemplary SISS of the project menu of TABLE 3. In this example all nineteen shots are duly identified, quality control criteria are exceeded and the message is correctly received and interpreted. The binary shots have been used to command certain downhole actions. The time-shifted seismic shots have been used to communicate that the VSP receiver 150 is 12,200 feet from the surface along the borehole trajectory, the repeatable seismic source 110 is offset 1300 feet from the receiver, the downhole clock was estimated to be 1.00 milliseconds fast, there are nineteen shots in the current SISS and there are nineteen shots planned for the next SISS.

TABLE 5 provides an example of a project menu used to communicate from the surface to the VSP receiver 150 by utilizing binary seismic shots combined with activation and pausing of drill rotation as a hybrid communication method. The activation and pausing of drill rotation begins with a pause of duration 30 seconds. This is followed by 30 seconds of drilling, then 30 seconds of pause and then another 30 seconds of drilling. Correct adherence to start and stop times need only be within 5 seconds according to the project menu (to allow for variance induced by the operator or the processes themselves). After the second pause of 30 seconds quiet conditions are maintained for another 180 seconds to allow successful seismic communication via the SISS. In this project menu the drill rotation signals has been used as a means of confirming that an SISS is to follow immediately. The seismic communication portion of this project menu is the same as that in the menu of TABLE 1. It utilizes binary seismic shots and no time-shift seismic shots.

TABLE 6 is an example of the utilization of the hybrid project menu of TABLE 5 in a specific case. The VSP receiver 150 correctly perceives the drill rotation and pause alternation and then prepares to receive the seismic communication according to the remainder of the menu. Recording is not initiated until the drill conveyed message has been received and interpreted, conserving power and computer resources. The VSP receiver correctly receives, records, processes and interprets the hybrid message in this example.

Downhole clock 510 drift is determined for the period between an initial seismic measurement and a subsequent seismic measurement at the identical receiver position as has been revealed in the preceding descriptions and illustrations. Assuming the correctness of each such determination of drift and ignoring for the present discussion the effect of noise in possibly injecting error into the drift determinations, there is a limitation in the proposed method due to the fact that drift is not calculated directly for consecutive positions in the borehole but only between successive occupations of the same position. This necessitates construction of a drift rate graph that provides a best determination of the probable drift rate (and means of calculating drift) between each pair of consecutively occupied positions in the borehole for the entire duration of the project.

Beginning at the first position that is re-occupied and re-shot, for example the deepest position attained, as at the end of FIG. 9 and beginning of FIG. 10, a determination of total drift and drift rate is made for the period between the two acquisitions of seismic data. There is no issue with assuming that drift rate was constant during this period as no intervening seismic measurements were made. Next, the drill string is pulled to the next higher surveyed position in the borehole and it is re-shot. The total drift and drift rate are determined for the time period between the two acquisitions of seismic data. This is for a longer period and contains the shorter period that was surveyed just prior. There is no direct way of knowing from the seismic data or the pair of drift calculations whether the drift rate at the beginning of the period and the drift rate at the end of the period were identical. Thus the practitioner must either make some assumption such as that the drift rates were identical or must exercise a rationale that provides a different attribution of drift rates and the drift increments between the beginning period and the ending period.

If the drift rate is calculated to be the same as for the internal independently-measured period, of course, the most reasonable assumption is that drift rate held constant throughout the entire interval. However, if the initial calculation of the overall drift rate for the overall period differs from that calculated for the contained period, a different drift rate must be ascribed to the beginning and ending periods (different from that of the contained period). These two intervals may be assumed to have identical drift rates or the two rates may be assumed to differ, so long as the total drift for the overall period is honored. If no guidance is available the beginning and ending periods are assumed to have had the same drift rate. If other information is available, such as temperature history of the downhole clock 510, a different assumption may be applied, such as that the drift rate was proportional to temperature of the clock.

As the process continues and more borehole positions are shot, similar calculations to those described in the preceding paragraph are made. Drift and drift rate graphs for the downhole clock 510 are built for the first measured time period and extended until the entire time period is graphed, from the initial synchronization to the master clock 285 until return of the downhole clock to the surface and its final re-synchronization to the master clock. Thus after completion of the downhole episode a completed graph of drift and drift rate is available to the computer processors and the human overseers.

Following the downhole episode described in the preceding paragraphs another may follow. If positions in the borehole that were previously shot and graphed are re-shot, further drift rate information is gained as well as additional independent seismic travel time measurements. The new information may be processed independently and it may also be combined with the information and results from the prior episode. The clock drift rate and drift graphs from the prior episode may be revised as a result of incorporation of the new independent measurements. Reliance on drift rate assumptions made during the first episode may be reduced and the accuracy of the drift rate and drift graph for that episode improved. Conversely the calculations from the prior episode may be used to improve the results from the current episode, improving the basis of drift rate assumptions. Best drift and drift rate knowledge is available after all of the seismic information for the project has been acquired and combined. However, the drift and drift rates calculated during earlier stages will have greatly enhanced the quality of the seismic travel time measurements and estimates made then. This early 'imperfect' information will have been of great value in operational decisions that are necessarily made at early stages, while drilling operations are underway.

In any determination of seismic travel time according to the preferred embodiment of the invention, such as illustrated by FIG. 13, the influence of seismic noise may be to introduce error into the determination. The scatter of cross-correlation peak times shown in TABLES 2, 4 and 6 is such as can be caused by seismic noise. Taking a series of identical shots to convey one piece of information enable methods of reducing noise influence on the quality of seismic communication, synchronization and VSP imaging. In poor signal-to-noise ratio situations, such as might occur at great depths in a borehole, it is beneficial to use a seismic travel time model for the current project that integrates information gleaned from a variety of sources to provide the geophysicist's expectation of travel times for each pair of source and receiver positions. These sources would normally include velocity and travel times maps and models from prior 3D seismic surveys, results from prior VSP surveys in adjacent wells, etc. And as the current project obtains seismic travel times, e.g. in VSP surveying of the shallower borehole, this information would also be incorporated into the model. The seismic travel time model for the current borehole can be used to constrain arrival time measurements and reduce the likelihood that excessive noise might corrupt clock drift measurements. Measurements outside of an allowable range are simply withheld from incorporation in the clock drift and drift rate graphs in this approach. Subsequent measurements might confirm the correctness of the measurements resulting instead in a revision of the seismic travel time model. Thus this is a conservative approach that yields the most reasonable results that can be achieved under the conditions of the project.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims that follow, the scope of which shall include all equivalents of the subject matter of the claims.

The invention claimed is:

1. A while-drilling vertical-seismic-profiling (VSP) apparatus comprising:
  (a) a source of substantially repeatable seismic signals positioned proximately of the Earth's surface;
  (b) a seismic signal controller having a first clock for initiating signals from said source at selected moments, said selected moments occurring exclusively within time windows selected from among a regularly recurring series of time windows
  (c) a drill string element having a data processor, a second clock and an operatively associated seismic signal receiver secured thereto; and,
  (d) a data processor control program for;
    i. analyzing successive seismic signals received within said selected time windows by said signal receiver for amplitude-time correspondence and for verifying a signal received by said receiver as being initiated by said source;

ii. measuring a first time differential between a predetermined moment relative to an opening of the selected window and receipt of a verified signal; and, iii. measuring a second time differential between successive first time differentials to determine a clock synchronization drift value.

2. A while-drilling vertical-seismic-profiling apparatus as described by claim 1 wherein a signal controller program causes successive seismic signals from said source to be initiated at selected variable time intervals.

3. A while-drilling vertical-seismic-profiling apparatus as described by claim 2 wherein said data processor control program measures said variable time intervals and determines encoded operational information therefrom.

4. A while-drilling vertical-seismic-profiling apparatus as described by claim 3 wherein said signal controller program prevents said source from initiating seismic signals when a drill string comprising said element is operating to advance said borehole while said regularly recurring time window series continues.

5. A while-drilling vertical-seismic-profiling apparatus as described by claim 1 wherein said drill string element further comprises signal transmission means for transmitting information comprising said measurements to said seismic signal controller.

* * * * *